(12) United States Patent
Paladugu et al.

(10) Patent No.: US 11,246,069 B2
(45) Date of Patent: Feb. 8, 2022

(54) SINGLE TRANSMIT SHARING DURING HANDOVER AND DUAL CONNECTIVITY OPERATIONS

(71) Applicant: QUALCOMM INCORPORATED, San Diego, CA (US)

(72) Inventors: Karthika Paladugu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/666,994

(22) Filed: Oct. 29, 2019

(65) Prior Publication Data

US 2020/0145888 A1    May 7, 2020

Related U.S. Application Data

(60) Provisional application No. 62/754,512, filed on Nov. 1, 2018.

(51) Int. Cl.
*H04W 36/00* (2009.01)
*H04W 72/04* (2009.01)
(Continued)

(52) U.S. Cl.
CPC ... *H04W 36/0077* (2013.01); *H04W 36/0066* (2013.01); *H04W 72/042* (2013.01); *H04W 76/27* (2018.02); *H04W 80/02* (2013.01)

(58) Field of Classification Search
CPC ......... H04W 36/0005; H04W 36/0011; H04W 36/0016; H04W 36/0022; H04W 36/0027;
(Continued)

(56) References Cited

U.S. PATENT DOCUMENTS

| 2013/0201959 A1* | 8/2013 | Guo | H04W 52/40 |
| | | | 370/331 |
| 2014/0120916 A1* | 5/2014 | Du | H04W 36/28 |
| | | | 455/436 |

(Continued)

FOREIGN PATENT DOCUMENTS

| WO | 2005022304 A2 | 3/2005 | |
| WO | WO-2017193940 A1 * | 11/2017 | ............ H04W 36/08 |

(Continued)

OTHER PUBLICATIONS

CMCC: "Discussion of '0ms' Interruption Handover for Single TX/RX UE in Context of NR", 3GPP Draft; R2-1800791, 3rd Generation Partnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018 Jan. 12, 2018, XP051386353, Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018] paragraph [0002]; figure 1, 5 pages.

(Continued)

*Primary Examiner* — Un C Cho
*Assistant Examiner* — Lalita W Pace
(74) *Attorney, Agent, or Firm* — Haynes and Boone, LLP

(57) ABSTRACT

Wireless communications systems and methods related to communications in a wireless network during handover and/or dual connectivity operations are provided. A user equipment (UE) transmits, to a first base station (BS), a first communication signal based on a first time-division multiplexed (TDM) configuration. The UE transmits, to a second BS different from the first BS, a second communication signal, the second communication signal being multiplexed with the first communication signal based on the first TDM configuration. The UE transmits, to the first BS, a third communication signal based on a second TDM configura- (Continued)

tion different from the first TDM configuration. The first TDM configuration and the second TDM configuration are associated with a handover from the first BS to the second BS. The UE transmits, to the second BS, a fourth communication signal, the fourth communication signal being multiplexed with the third communication signal based on the second TDM configuration.

27 Claims, 13 Drawing Sheets

(51) Int. Cl.
*H04W 76/27* (2018.01)
*H04W 80/02* (2009.01)
(58) Field of Classification Search
CPC ......... H04W 36/0033; H04W 36/0044; H04W 36/0055; H04W 36/0058; H04W 36/0066; H04W 36/0077; H04W 36/08; H04W 76/27; H04W 72/042; H04W 72/0446; H04W 72/0453; H04W 72/048; H04W 72/0486; H04W 80/02; H04W 36/18; H04W 36/30
See application file for complete search history.

(56) References Cited

U.S. PATENT DOCUMENTS

| | | | | |
|---|---|---|---|---|
| 2016/0073442 | A1* | 3/2016 | Koskinen | H04W 76/15 370/329 |
| 2016/0112913 | A1* | 4/2016 | Malkamaki | H04L 5/0048 455/444 |
| 2016/0150586 | A1* | 5/2016 | Lei | H04W 72/085 370/332 |
| 2017/0111837 | A1* | 4/2017 | Ahn | H04W 36/0072 |
| 2018/0092156 | A1* | 3/2018 | Kim | H04W 72/1273 |
| 2018/0220423 | A1* | 8/2018 | Ly | H04L 1/0028 |
| 2020/0022043 | A1* | 1/2020 | Pelletier | H04W 36/0085 |
| 2020/0359277 | A1* | 11/2020 | Liu | H04L 5/0055 |
| 2021/0037591 | A1* | 2/2021 | Niu | H04W 28/06 |

FOREIGN PATENT DOCUMENTS

| | | | | |
|---|---|---|---|---|
| WO | WO-2020068648 | A1 * | 4/2020 | ........ H04W 36/0069 |
| WO | WO-2020069174 | A1 * | 4/2020 | ............ H04W 36/38 |

OTHER PUBLICATIONS

Huawei et al., "Close to 0 ms HO Interruption Time for Single Tx/Rx UE", 3GPP Draft, 3GPP TSG-RAN WG2 #97bis, R2-1703382 Close to 0 ms HO Interruption Time for Single Tx-Rx UE, 3rd Generation Partnership Project (3GPP), Mobile Competence Centre, 650, Route Des Lucioles, F-06921 Sophia-Antipolis, vol. RAN WG2, No. Spokane, US, Apr. 3, 2017-Apr. 7, 2017, Apr. 3, 2017 (Apr. 3, 2017), XP051245244, pp. 1-8, Retrieved from the Internet: URL:http://www.3gpp.org/ftp/Meetings_3GPP_SYNC/RAN2/ Docs/ [retrieved on Apr. 3, 2017].
International Search Report and Written Opinion—PCT/US2019/ 058884—ISA/EPO—Feb. 25, 2020.
Qualcomm Incorporated et al., "UL TDM Aspects of Enhanced MBB HO using Dual Active Protocol Stack", 3rd Generation Partnership Project (3GPP) TSG-RAN WG2 Meeting #107, R2-1909848, Prague, Czech Republic, 20190826-20190830, Aug. 16, 2019, 8 pages. http://www.3gpp.org/ftp/tsg_ran/WG2_RL2/ TSGR2_107/Docs/R2-1909848.zip [retrieved on Aug. 16, 2019].
Qualcomm Incorporated: "LTE Mobility Enhancements", 3rd Generation Partnership Project (3GPP) TSG-RAN WG2 Meeting #103bis, R2-1814206, Chengdu, China, Oct. 8, 2018-Oct. 12, 2018, Sep. 28, 2018, 9 pages. http://www.3gpp.org/ftp/tsg%5Fran/WG2%5FRL2/ TSGR2%5F103bis/Docs/R2%2D1814206%2 Ezip [retrieved on Sep. 28, 2018].
Qualcomm Incorporated: "UE RF Chain Requirements to Reduce LTE eMBB HO Interruption Time Close to 0ms", 3rd Generation Partnership Project (3GPP) TSG-RAN WG2 Meeting #105bis, R2-1904625, Ran WG2, Xian, China, Apr. 8, 2019-Apr. 12, 2019, Mar. 29, 2019, 6 Pages. http://www.3gpp.org/ftp/TSG_RAN/WG2_ RL2/TSGR2 105bis/Docs/R2-1904625.zip [retrieved on Mar. 29, 2019].

* cited by examiner

SINGLE TRANSMIT SHARING DURING HANDOVER AND DUAL CONNECTIVITY OPERATIONS

CROSS REFERENCE TO RELATED APPLICATIONS

The present application claims priority to and the benefit of U.S. Provisional Patent Application No. 62/754,512, filed Nov. 1, 2018, which is hereby incorporated by reference in its entirety as if fully set forth below and for all applicable purposes.

TECHNICAL FIELD

This application relates to wireless communication systems, and more particularly to communications in a wireless network during handover and/or dual connectivity operations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

Mobility support is important in a wireless communication network, where a UE may travel from one coverage area or cell to another coverage area or cell. For example, a BS may serve a UE in a coverage area of the BS. The UE may report channel measurements. When the BS detects a degradation in channel quality based on the reported channel measurements and/or other channel information, the BS may initiate a handover of UE to another BS that can provide the UE with a better channel quality. Accordingly, improvements to mobility support are also desirable for NR.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a use equipment (UE) to a first base station (BS), a first communication signal based on a first time-division multiplexed (TDM) configuration; transmitting, by the UE to a second base station different from the first base station, a second communication signal, the second communication signal being multiplexed with the first communication signal based on the first TDM configuration; transmitting, by the UE to the first base station, a third communication signal based on a second TDM configuration different from the first TDM configuration, wherein the first TDM configuration and the second TDM configuration are associated with a handover from the first BS to the second BS; and transmitting, by the UE to the second base station, a fourth communication signal, the fourth communication signal being multiplexed with the third communication signal based on the second TDM configuration.

In an additional aspect of the disclosure, a method of wireless communication includes receiving, by a first base station (BS) from a user equipment (UE), a first communication signal based on a first time-division multiplexed (TDM) configuration, the first TDM configuration determined based on a coordination with a second BS for a handover of the UE to the second BS; and receiving, by the first BS from the UE, a second communication signal based on a second TDM configuration different from the first TDM.

In an additional aspect of the disclosure, a user equipment (UE) includes a transceiver; a memory; and a processor coupled to the transceiver and the memory, the processor configured to transmit via the transceiver, to a first base station BS, a first communication signal based on a first time-division multiplexed (TDM) configuration; transmit via the transceiver, to a second base station different from the first base station, a second communication signal, the second communication signal being multiplexed with the first communication signal based on the first TDM configuration; transmit via the transceiver, to the first base station, a third communication signal based on a second TDM configuration different from the first TDM configuration, wherein the first TDM configuration and the second TDM configuration are associated with a handover; and transmit via the transceiver, to the second base station, a fourth communication signal, the fourth communication signal being multiplexed with the third communication signal based on the second TDM configuration.

In an additional aspect of the disclosure, a base station (BS) includes a transceiver; a memory; and a processor coupled to the transceiver and the memory, the processor configured to receive via the transceiver, from a user equipment (UE), a first communication signal based on a first time-division multiplexed (TDM) configuration, the first TDM configuration determined based on a coordination with a second BS for a handover of the UE to the second BS; and receive via the transceiver, from the UE, a second communication signal based on a second TDM configuration different from the first TDM.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
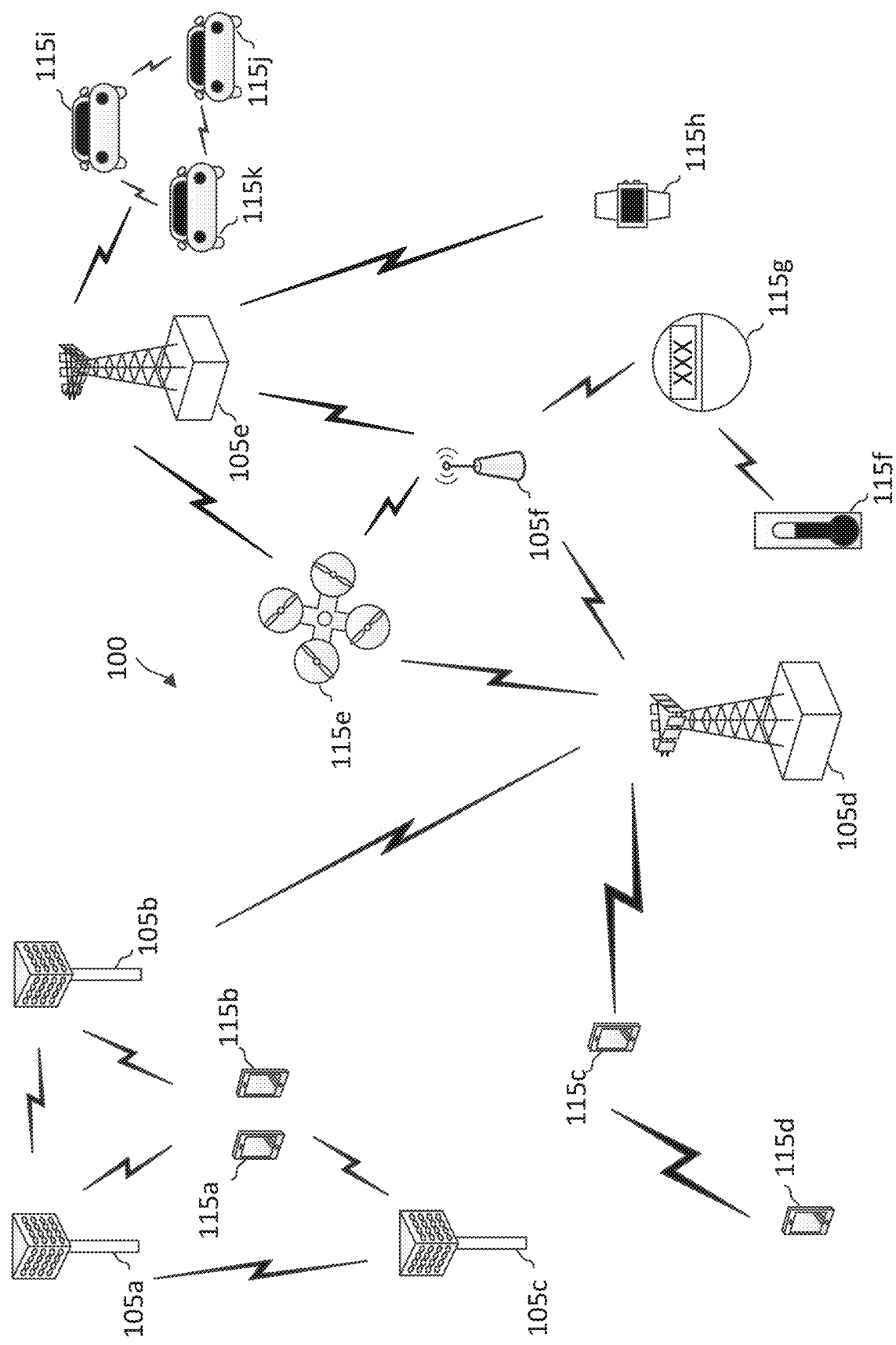
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for a UE having a single transmit path to maintain multiple connections with multiple BSs. The disclosed embodiments configure various TDM patterns for the UE to share the single transmit path for transmissions over multiple links associated with the connections. The TDM patterns can be switched to adapt to scheduling needs, traffic loads, and/or channel conditions over the multiple links. In an example, during a make-before-break (MBB) handover, a UE may be simultaneously connected to a source BS serving the UE and a target BS for the handover. The disclosed embodiments can configure the UE to maintain the simultaneous connections to the source BS and the target BS during a handover execution phase and/or during at least a time period in a handover completion phase. The disclosed embodiments may configure different TDM patterns for the handover execution phase and the handover completion phase. The maintaining of the simultaneous connections during the handover can reduce UL interruption compared to traditional handover procedures where a UE disconnects to a source BS when executing a handover. In another example, during dual connectivity, a UE may simultaneously connect to a primary BS and a secondary BS serving the UE. The disclosed embodiments may configure different TDM patterns for the dual connections during different time periods to provide an optimal performance over the dual connections.

In an embodiment, a first BS configures a UE with a first TDM pattern for communicating with the first BS and a second BS associated with the first BS. The TDM pattern includes a set of transmission slots for transmissions over a first communication link from the UE to the first BS and another set of transmission slots for transmission over a second communication link from the UE and the second BS. The UE transmits a first communication signal to the first BS and a second communication signal to the second BS by time-multiplexing the first communication signal and the second communication signal based on the first TDM pattern.

In an embodiment, the first BS or second coordinates with the second BS to determine the first TDM pattern based on a service requirement of the UE, a capability of the UE, traffic loadings on the first communication link and the second communication link, and/or channel conditions or qualities of the first communication link and the second communication link.

In an embodiment, the first BS or second BS determines to switch from the first TDM pattern to a second TDM pattern, for example, based on changes in scheduling needs, traffic loads, and/or channel conditions. The first BS or second BS instructs the UE to switch to the second TDM pattern. The UE transmits a third communication signal to the first BS and a fourth communication signal to the second BS by time-multiplexing the third communication signal and the fourth communication signal based on the second TDM pattern.

In an embodiment, the UE determines to switch from the first TDM pattern to a second TDM pattern, for example, based on channel quality measured by the UE. The UE indicates the switch to the second TDM pattern to the first BS and/or the second BS. The UE transmits a third communication signal to the first BS and a fourth communication signal to the second BS by time-multiplexing the third communication signal and the fourth communication signal based on the second TDM pattern.

In an embodiment, a BS can configure a UE with one or more TDM patterns via radio resource control (RRC) reconfiguration message. The first BS or second BS can indicate the switch of the TDM pattern to the UE via layer 1 (L1) in physical downlink control channel (PDCCH) downlink control information (DCI) signaling, layer 2 (L2) signaling in a medium access control (MAC) control element (CE), and/or layer 3 (L3) signaling in a radio resource control (RRC)

message. In an embodiment, a UE may indicate a TDM pattern switch to a BS via L2 signaling in a MAC CE.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links. The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

While the UE 115 is connected to the BS 105, the UE may switch to another BS 105 due to degradation in the received signal power from the serving BS 105. The degradation can occur when the UE 115 travels out of a coverage area of the serving BS 105. The process of a connected UE 115 changing its association from one BS 105 to another BS 105 is referred to as handover. In an embodiment, the network 100 supports make-before-break (MBB) handover, where a UE 115 maintains the connection to the source cell (e.g., the serving BS 105) while establishing a connection to a target cell (e.g., a target BS 105). The MBB handover can reduce service interruption during the handover. Mechanisms for MBB handover are described in greater detail herein.

Figure 2:
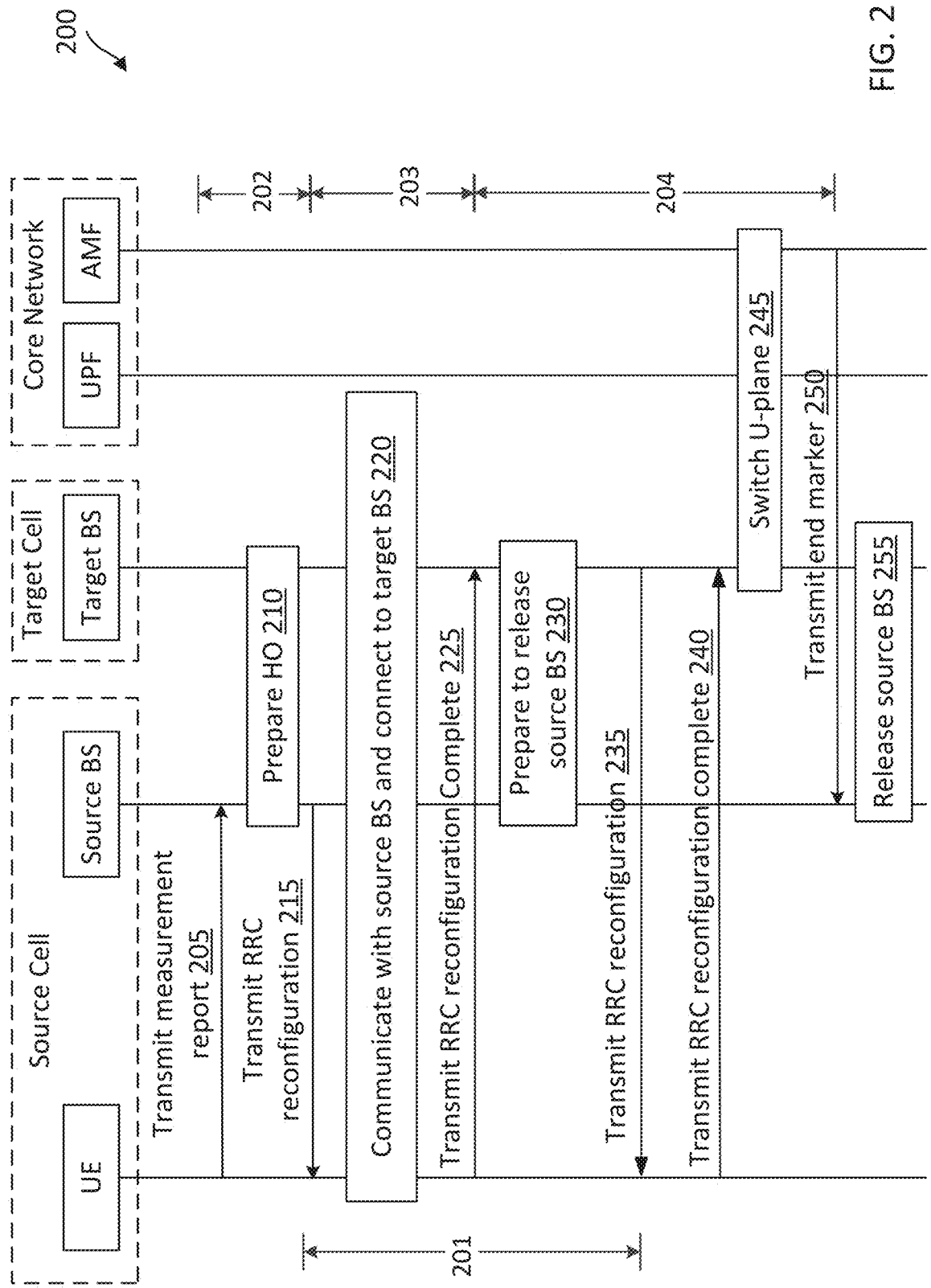
FIG. 2 is a signaling diagram illustrating a handover method according to embodiments of the present disclosure.

FIG. 2 is a signaling diagram illustrating a handover method 200 according to embodiments of the present disclosure. The method 200 may be employed by the network 100 for MBB handover. The method 200 is implemented by a source BS serving a UE in a serving cell or source cell, a target BS in a target cell, and a core network including a user plane function (UPF) component and an access and mobility management function (AMF) component. The source BS and the target BS may correspond to BSs 105 in the network 100. The UE may correspond to a UE in the network 100. The source BS and the target BS are in communication with the core network for mobility support and user plane functions. Steps of the method 200 can be executed by computing devices (e.g., a processor, processing circuit, and/or other suitable component) of the source BS, the UE, the target BS, the UPF component, and the AMF component. As illustrated, the method 200 includes a number of enumerated steps, but embodiments of the method 200 may include additional steps before, after, and in between the enumerated steps. In some embodiments, one or more of the enumerated steps may be omitted or performed in a different order. The handover procedure may be divided into a handover preparation phase 202, a handover execution phase 203, and a handover completion phase 204.

In the handover preparation phase 202, the UE may perform and report channel measurements and the network prepares for a handover. At step 205, the UE transmits a measurement report. The measurement report may include measurements about the quality of the channel between the UE and the source BS. The measurements may include a reference signal received power (RSRP), a reference signal received quality (RSRQ), a received signal strength indicator (RSSI), and/or a signal-to-interference-noise-ratio (SINR).

At step 210, the source BS may coordinate with the target BS to prepare for a handover (HO), for example, based on the measurement report indicating that the signal quality from the source BS to the UE is low. As part of the handover preparation, the source BS may request the target BS to prepare for the handover. The source BS may communicate the UE's radio resource control (RRC) context information and/or other UE's configurations to the target BS. The target BS may prepare for the handover by reserving resources for the UE. After reserving the resources, the target BS may transmit an acknowledgement to the source BS in response to the handover request.

At step 215, the source BS transmits an RRC reconfiguration message to the UE. The RRC reconfiguration message may include a handover command instructing the UE to handover from the source BS to the target BS, in which the handover execution phase 203 begins. The handover command may include information associated with the target BS, for example, a random access channel (RACH) preamble assignment for accessing the target BS.

During the handover execution phase 203, the UE may execute the handover by performing a random access procedure with the target BS. At step 220, the UE continues to communicate with the source BS and establishes a connection to the target BS. In other words, the UE may transmit UL data and/or controls to the source BS and receive DL data and/or controls while synchronizing to the target BS and performing a random access procedure with the target BS, as described in greater detail herein.

At step 225, upon a successful connection establishment to the target BS, the UE transmits an RRC reconfiguration completion message to the target BS, in which the handover completion phase 204 begins.

During the handover completion phase 204, the UE have successfully connected to the target BS. The UE may begin to use both the source connection to the source BS and the target connection to the target BS and prepare to release the source connection. At step 230, the target BS and the source BS may coordinate with each other to prepare for the release of the source BS from serving the UE. For example, the source BS may forward any buffered DL data for the UE and/or any received UL data to the target BS.

At step 235, the target BS transmits an RRC reconfiguration message to the UE to instruct the UE to release the connection to the source BS. Upon receiving the instruction to release the source BS's connection, the UE may stop communicating with the source BS.

At step 240, the UE transmits an RRC reconfiguration completion message to the target BS.

At step 245, the target BS, the UPF component, and the AMF component may coordinate to switch the user-plane (U-plane) path of the UE from the source BS to the target BS. Until this point of time, the DL data transmission for UE is still being routed to the source BS.

At step 250, the AMF component transmits an end mark message to the source BS after the U-plane path is switched.

At step 255, the target BS and the source BS may coordinate to release the source BS.

As can be seen, the MBB handover procedure involves the UE to maintain simultaneous connections to the source BS and the target BS during a time period 201 starting from the beginning of the handover execution phase 203 until an instruction to release the source BS is received from the target BS in the handover completion phase 204. The maintaining of the simultaneous connections to the source BS and the target BS can allow for a handover with zero or a minimal interrupt time. However, depending on the UE designs and capabilities, some UEs may not be capable of performing simultaneous transmissions over two communication links. For example, a UE may include a single RF chain, and thus can only transmit on link at a time. In some other examples, a UE may include a dual RF chain, but may not be able to transmit on both links due to incompatible band combination and/or interference issues.

Accordingly, the present disclosure provides techniques for UEs that cannot simultaneously transmit on both links to perform MBB handover. The present disclosure utilizes various TDM configurations to allow such UEs to benefit from MBB handover with a reduced interruption time for UL communications and a reduced delay for DL communications. In addition, the present disclosure provides different TDM configurations for different phases of handover based on the traffic needs between the UE and the source BS and between the UE and the target BS.

Figure 3:
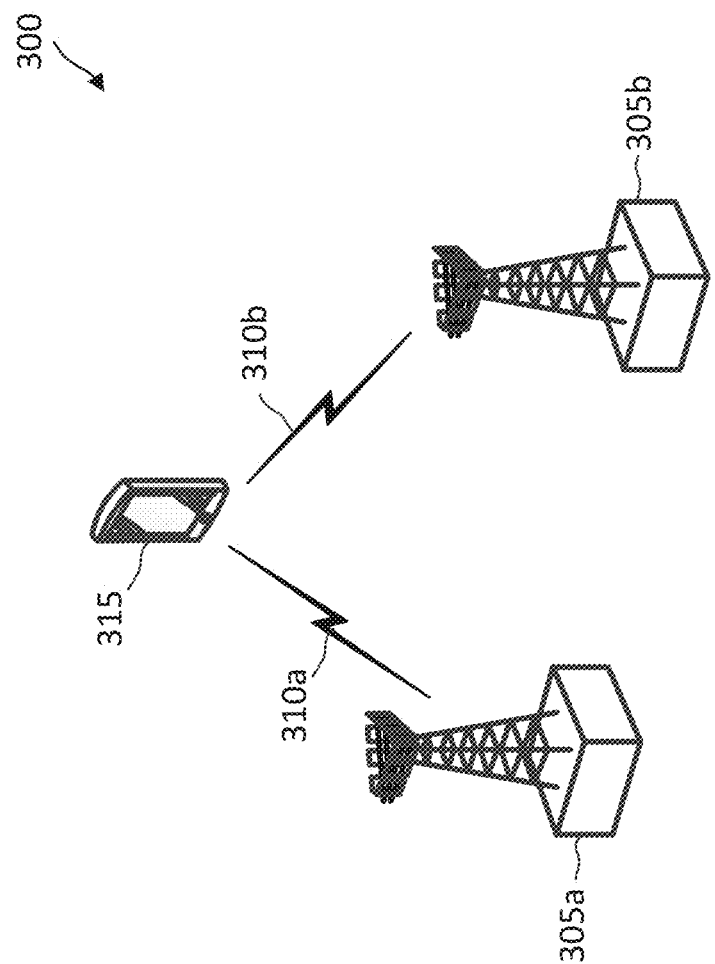
FIG. 3 illustrates a wireless communication network implementing dual connectivity according to embodiments of the present disclosure.

FIG. 3 illustrates a wireless communication network 300 implementing dual connectivity according to embodiments of the present disclosure. The network 300 may correspond to a portion of the network 100. The network 300 includes a UE 315, a BS 305a, and a BS 305b. The UE 315 may correspond to a UE 115 in the network 100. The BS 305a and the BS 305b may correspond to BSs 105 in the network 100. The UE 315 is connected to both the BS 305a and the BS 305b over communication links 310a and 310b, respectively, for dual connectivity operations. In some instances, one of the BSs 305 may function as a master BS or a primary BS and the other BS 305 may function as a secondary BS. The BS 305a and the BS 305b may operate on different frequency bands. In addition, the BS 305a and the BS 305b may use different radio access technologies (RATs). In other words, the UE 315 may support multiple RATs. While FIG. 3 illustrates the UE 315 connecting to two BSs 305, in some embodiments, the UE 315 may simultaneously connect to any suitable number of BSs 305 (e.g., about 3 or more).

Some example dual connectivity deployment scenarios may include NR-NR dual connectivity (DC), new generation-radio access network (NG-RAN) E-UTRA dual connectivity (NGEN-DC), NE dual connectivity, and E-UTRA-NR dual connectivity (EN-DC). As an example, for EN-DC, the BS 305a may be a master BS using LTE technology and the BS 305b may be a secondary BS using NR technology. For NGEN-DC, the BS 305a may be a master BS using LTE technology and the BS 305b may be a secondary BS using NR technology similar to the EN-DC, but may further replace an evolved packet core (EPC) network with a 5G core network. For NE-DC, the BS 305a may be a master BS using NR technology and the BS 305b may be a secondary BS using LTE technology. For NR-NR dual connectivity, the BS 305a may be a master BS using NR technology and the BS 305b may be a secondary BS also using NR technology.

As can be seen, to support dual connectivity, the UE 315 maintains two connections, one to the BS 305a and the other to the BS 305b. In some instances, the channel conditions of the communication links 310a and 310b and/or traffic loading on the communication links 310a and 310b may vary over time.

Accordingly, the present disclosure provides techniques to configure different TDM configurations for a UE with dual connectivity to communicate with a primary or master BS and a secondary BS based on channel conditions and/or traffic loading.

Figure 4:
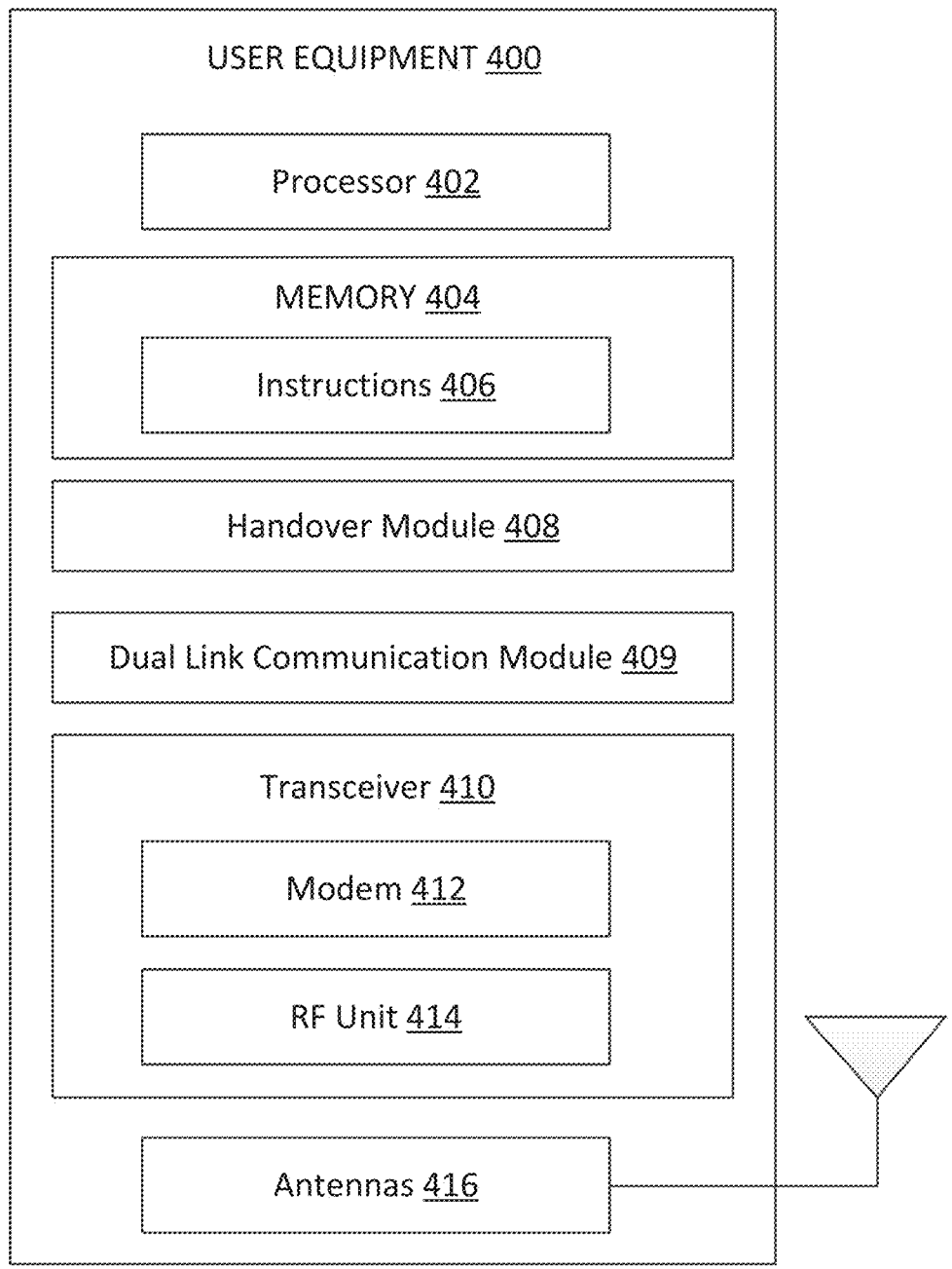
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 in the network 100 or a UE 315 in the network 300 as discussed above. As shown, the UE 400 may include a processor 402, a memory 404, a handover module 408, and a dual link communication module 409, a transceiver 410 including a modem subsystem 412 and a radio frequency (RF) unit 414, and one or more antennas 416. These elements may be coupled with each other and in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-12. Instructions 406 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the handover module 408 and the dual link communication module 409 may be implemented via hardware, software, or combinations thereof. For example, each of the handover module 408 and the dual link communication module 409 may be implemented as a processor, circuit, and/or instructions 406 stored in the memory 404 and executed by the processor 402. In some examples, a UE may include one of the handover module 408 or the dual link communication module 409. In other examples, a UE may include both the handover module 408 and the dual link communication module 409.

The handover module 408 and the dual link communication module 409 may be used for various aspects of the present disclosure, for example, aspects of FIGS. 6-12. The handover module 408 is configured to perform channel measurements for a channel between the UE 400 and a serving BS or source BS (e.g., the BSs 105 and 305), report channel measurements to the BS, receive a handover command from the source BS to handover to a target BS, establish a connection with the target BS (e.g., using a random access procedure) while continuing to communicate with the source BS (e.g., via the dual link communication module 409), transmit a handover completion indication to the target BS upon a successful connection with the target BS, receive an instruction from the target BS to release the connection with the source BS after the handover, stop to communicate with the source BS, and switch to communicate with the target BS. The handover operations can be substantially similar to the method 200.

The dual link communication module 409 is configured to receive a first TDM configuration from a first BS, transmit a first UL communication signal to the first BS via a first communication link and transmit a second UL communication signal to a second BS via a second communication link based on the first TDM configuration, receive an instruction to switch to a second TDM configuration, transmit a third UL communication signal to the first BS via the first communication link and transmit a fourth UL communication signal to the second BS via the second communication link based on the second TDM configuration. The first TDM configuration and the second TDM configuration may allow for different number of transmission opportunities for the first communication link and the second communication link during different periods of time.

During a handover procedure, the first BS may be a source BS serving the UE 400 and the second BS may be a target BS for the handover. The first TDM configuration may be used during a handover execution phase (e.g., the handover execution phase 203) and the second TDM configuration may be used during a handover completion phase (e.g., the handover completion phase 204). During the handover execution phase, the first TDM configuration may allow for a greater number of transmission opportunities for the first communication link to the source BS than for the second communication link to the target BS. During the handover completion phase when the target BS prepares for the source BS to be released, the second TDM configuration may allow for a greater number of transmission opportunities for the second communication link to the target BS than for the first communication link to the source BS. When the handover is an intra-frequency handover, the first communication link and the second communication link may operate over the same frequency carrier. When the handover is an inter-frequency handover, the first communication link and the second communication link may operate over different frequency carriers. When the handover is an inter-RAT handover, the dual link communication module 409 is further configured to generate and transmit the first communication signal, the second communication signal, the third communication signal, and the fourth communication signal according to corresponding RATs.

During dual connectivity operations, the first BS may be the primary or master BS (e.g., the BS 305*a*) and the second BS may be a secondary BS (e.g., the BS 305*b*). The first communication link and the second communication link may operate over the same frequency carrier or different frequency carriers. Depending on the dual connectivity type, the dual link communication module 409 is further configured to generate and transmit the first communication signal, the second communication signal, the third communication signal, and the fourth communication signal according to corresponding RATs. The first TDM configuration and the second TDM configurations may be configured based on channel conditions and/or traffic load over the first communication link and the second communication link.

In an embodiment, the dual link communication module 409 is configured to report capabilities of the UE 400 to facilitate determination of TDM configurations for the dual link communications, perform channel measurements for channels between the UE 400 and the first BS and/or between the UE 400 and the second BS, determine a third TDM configuration for the dual link communications, transmit a request to the first BS and/or the second BS to switch to the third TDM configuration. In an embodiment, the dual link communication module 409 is further configured to maintain two layer 2 (L2) (e.g., medium access control (MAC)) stack for the dual connections during MBB handover. Mechanism for performing a MBB handover and dual connectivity operations are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the handover module 408, and/or the dual link communication module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement RATs.

In some aspects, the processor 402 may be coupled to the memory 404, the handover module 408, the dual link communication module 409, and/or the transceiver 410. The processor 402 and may execute operating system (OS) code stored in the memory 404 in order to control and/or coordinate operations of the handover module 408, the dual link communication module 409, and/or the transceiver 410. In some aspects, the processor 402 may be implemented as part of the handover module 408 and/or the dual communication module 409. In some aspects, the processor 402 is configured to transmit via the transceiver 410, to a first BS, a first communication signal based on a first TDM configuration; transmit via the transceiver 410, to a second BS different from the first BS, a second communication signal, the second communication signal being multiplexed with the first communication signal based on the first TDM configuration; transmit via the transceiver 410, to the first BS, a third communication signal based on a second TDM configuration different from the first TDM configuration, wherein the first TDM configuration and the second TDM configuration are associated with a handover; and transmit via the transceiver 410, to the second BS, a fourth communication signal, the fourth communication signal being multiplexed with the third communication signal based on the second TDM configuration.

Figure 5:
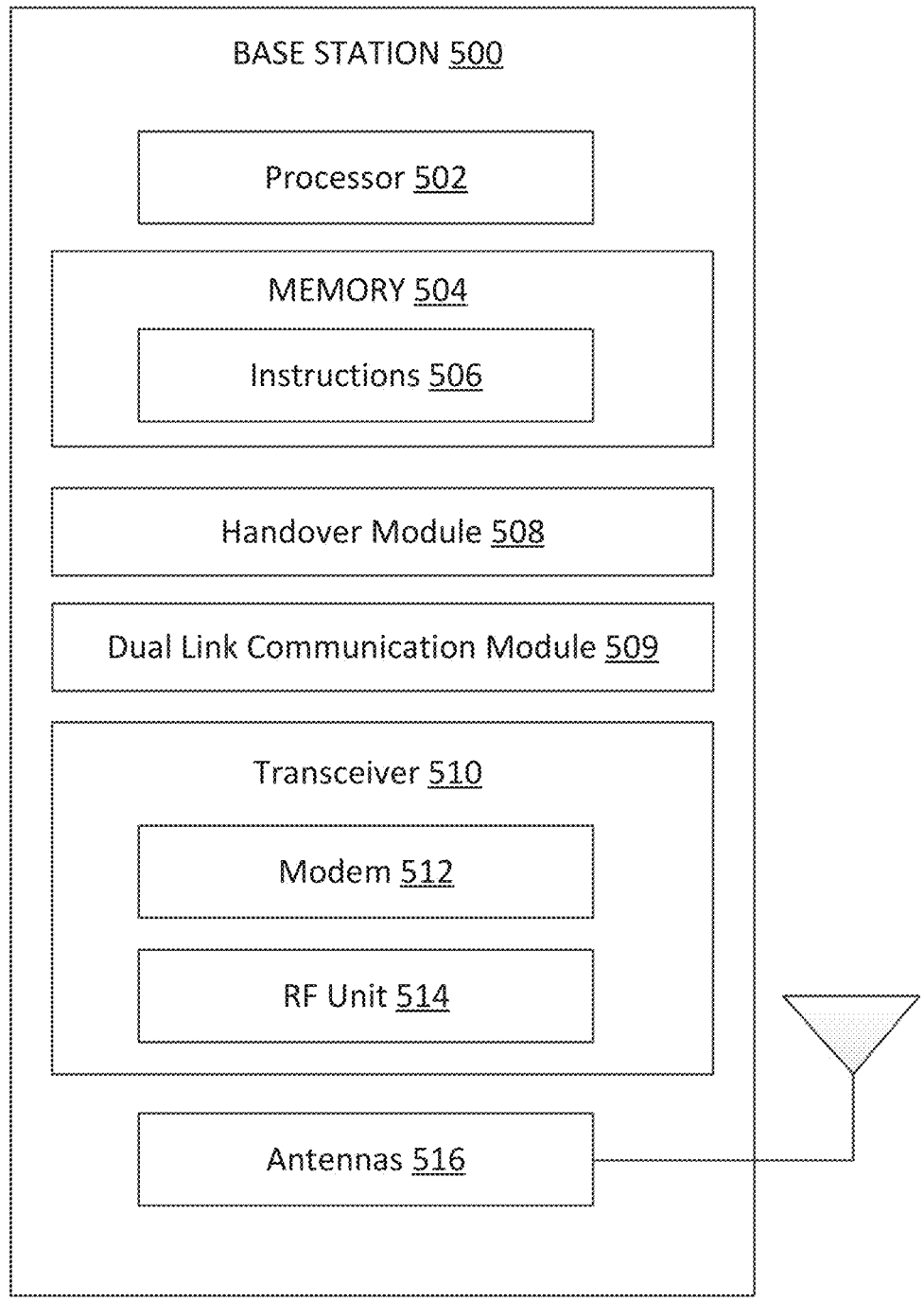
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 or a BS 305 as discussed above. A shown, the BS 500 may include a processor 502, a memory 504, a handover module 508, a dual link communication module 509, a transceiver 510 including a modem subsystem 512 and a RF unit 514, and one or more antennas 516. These elements may be coupled with each other and in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-11 and 13. Instructions 506 may also be referred to as code, which may be interpreted broadly to include any type of computer-readable statement(s) as discussed above with respect to FIG. 5.

Each of the handover module 508 and the dual link communication module 509 may be implemented via hardware, software, or combinations thereof. For example, each of the handover module 508 and the dual link communication module 509 may be implemented as a processor, circuit, and/or instructions 506 stored in the memory 504 and executed by the processor 502. In some examples, a BS may include one of the handover module 508 or the dual link communication module 509. In other examples, a BS may include both the handover module 508 and the dual link communication module 509.

The handover module 508 and the dual link communication module 509 may be used for various aspects of the present disclosure, for example, aspects of FIGS. 6-11 and 13. The handover module 508 is configured to receive channel measurement reports from a UE (e.g., the UEs 115, 315, and 400), determine whether o handover the UE to another BS based on the received channel measurement reports, transmit handover requests to one or more target BSs, coordinate with a target BS to prepare for a handover, transmits a handover command to the UE instructing the UE to handover to the target BS, continue to communicate with the UE while the UE establishes a connection with the target BS, coordinate with the target BS to prepare to release the connection with the UE, forward any remaining UE data to the target BS, receive an instruction from the target BS to release the connection to the UE, and release the connection to the UE. The handover operations can be substantially similar to the method 200. The BS 500 can also be a target BS, where the handover module 508 is configured to receive a handover request from a source BS, allocate resources to prepare for a UE to handover to the BS 500, monitor for a random access preamble signal from the UE, respond with a random access response, perform timing-advance, and provide a UL scheduling grant for the UE, receive a handover completion indication from the UE, coordinate with the source BS to release the source BS from connecting to the UE, and/or transmit an instruction to the UE to release the connection to the source BS. Additionally or alternatively, the handover module 508 and the dual link communication module 509 can be implemented in any combination of hardware and software, and may, in some implementations, involve, for example, processor 502, memory 504, instructions 506, transceiver 510, and/or modem 512.

The dual link communication module 509 is configured to coordinate with another BS to determine a first TDM configuration for communicating with the UE for dual link communications, transmit the first TDM configuration to the UE, receive a first UL communication signal from the UE based on the first TDM configuration, transmit an instruction to the UE to switch to a second TDM configuration, and/or receive a second UL communication signal from the UE based on the second TDM configuration. The first TDM configuration and the second TDM configuration may allow for different number of transmission opportunities for the BS 500 to communicate with the UE during different periods of time.

During a handover procedure, the BS 500 may be a source BS serving the UE or a target BS. The first TDM configuration may be used during a handover execution phase (e.g., the handover execution phase 203) and the second TDM configuration may be used during a handover completion phase (e.g., the handover completion phase 204). During the handover execution phase, the first TDM configuration may allow for a greater number of transmission opportunities for a source BS than for a target BS. During the handover completion phase when the target BS prepares for the source BS to be released, the second TDM configuration may allow for a greater number of transmission opportunities for the target BS than for the source BS. The handover can be an intra-frequency handover, an inter-frequency handover, or an inter-RAT handover.

During dual connectivity operations, the BS 500 may be the primary or master BS (e.g., the BS 305a) or a secondary BS (e.g., the BS 305b). The first TDM configuration and the second TDM configurations may be configured based on channel conditions and/or traffic load over a communication link (e.g., the communication links 310) between the BS 500 and the UE and a communication link between the UE and the other BS coordinating with the BS 500 for dual connectivity operations.

In an embodiment, the dual link communication module 509 is configured to receive a capability report from the UE, determine TDM configurations based on the UE's capabilities, service requirements (e.g., QoS), channel conditions, and/or network traffic loading. In an embodiment, the dual link communication module 509 is further configured to a request or an instruction from the UE to switch to a third TDM configuration for communications. Mechanism for performing a MBB handover and dual connectivity operations are described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115, 315, or 500. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 500 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement RATs.

In some aspects, the processor 502 may be coupled to the memory 504, the handover module 508, the dual link communication module 509, and/or the transceiver 510. The processor 402 and may execute OS code stored in the memory 504 to control and/or coordinate operations of the handover module 508, the dual link communication module 509, and/or the transceiver 510. In some aspects, the processor 502 may be implemented as part of the handover module 508 and/or the dual communication module 509. In some aspects, the processor 502 is configured to receive via the transceiver 510, from a UE, a first communication signal based on a first TDM configuration, the first TDM configuration determined based on a coordination with a second BS for a handover of the UE to the second BS; and receive via the transceiver 510, from the UE, a second communication signal based on a second TDM configuration different from the first TDM.

FIGS. 6-9 illustrates various mechanisms for a UE (e.g., the UEs 115, 315 and 400) with a single transmit path to maintain a connection with a source BS (e.g., the BSs 105, 305, and 500) and a target BS (e.g., the BSs 105, 305, and 500) at the same time during an MBB handover. For example, the UE may support a UL transmission over a single link at any time, but may support simultaneous DL receptions from two separate links. In FIGS. 6-9, the x-axes represent time in some constant units.

Figure 6:
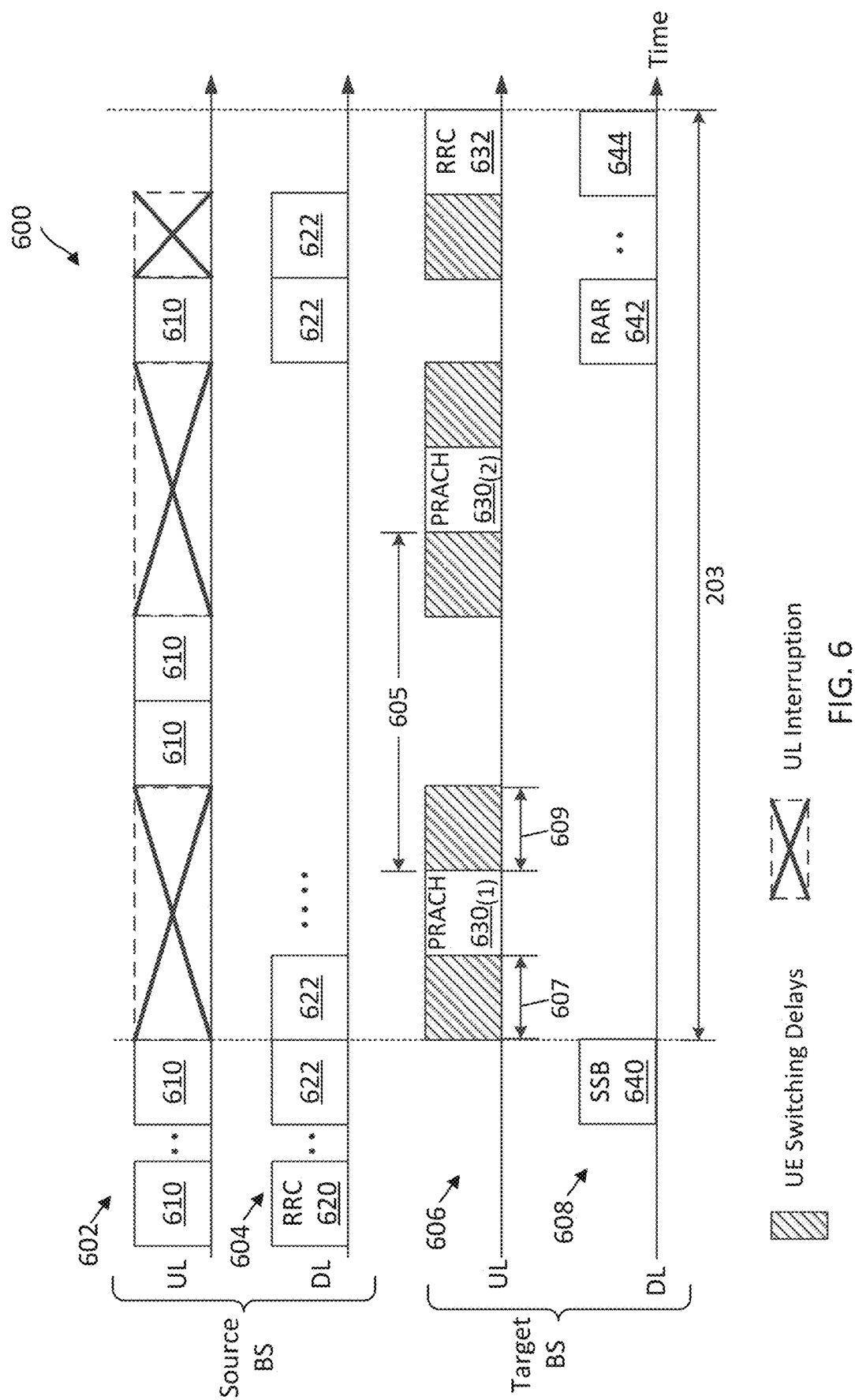
FIG. 6 illustrates a transmission sharing scheme for handover according to some embodiments of the present disclosure.

FIG. 6 illustrates a transmission sharing scheme 600 for handover according to some embodiments of the present disclosure. The scheme 600 may be employed by BSs such as the BSs 105, 305, and 500 and UEs such as the UEs 115, 315, and 400 in a network such as the networks 100 and 300. The scheme 600 may be substantially similar to the method 200 and provides a more detailed view of a UE sharing a single transmit path for UL and/or DL communications between the UE and a source BS serving the UE and between the UE and a target BS during a handover execution phase 203. The transmission timeline 602 illustrates UL communications received by the source BS from the UE. The transmission timeline 604 illustrates DL transmissions by the source BS. The transmission timeline 606 illustrates UL communications received by the target BS from the UE. The transmission timeline 608 illustrates DL transmissions by the target BS.

As described above, the handover execution phase 203 begins when the BS transmits a handover command to the UE. As shown in the timeline 604, the source BS transmits an RRC reconfiguration message 620 to the UE. The RRC reconfiguration message 620 includes a handover command instructing the UE to handover from the source BS to the target BS. As shown, prior to the handover execution phase, the UE may communicate UL communication signals 610*a* and/or DL communication signals 622*a* with the source BS. The UE maintains the source connection with the source BS during the handover execution phase 203, where the UE continues to communicate UL communication signals 610*b* and DL communication signals 622*b*.

While the UE is connected to the source BS, the UE may also perform a random access procedure with the target BS. The target BS transmits SSBs 640, for example, based on some predetermined periodicities. The SSBs 640 may include synchronization signals and system information associated with the target BS. The UE may listen for SSBs 640 from the target BS and synchronize to the target BS based on the SSBs 640. To perform random access, the UE transmits a random access preamble signal 630 (shown as 630$_{(1)}$) to the target BS. After transmitting the random access preamble signal 630, the UE may begin to monitor for a random access response (RAR) from the target BS during an RAR window 605. The duration of the RAR window 605 may vary depending on the embodiments. In some instances, the RAR window 605 can be about 10 milliseconds (ms) or less than 10 ms. When the UE fails to receive an RAR from the target BS during the RAR window 605, the UE transmits another random access preamble signal or physical random access channel (PRACH) signal 630 (e.g., shown as 630$_{(2)}$) after the RAR window 605 expires. For example, the target BS detects the second random access preamble signal 630$_{(2)}$ and responds with an RAR 642. After the UE establishes a connection with the target BS (e.g., receiving the RAR 642), the UE transmits an RRC reconfiguration completion message 632 to the target BS indicating the completion of the handover. The target BS may start to communicate with the UE, for example, by transmitting a DL communication signal 644 to the UE.

The UE may time-multiplex the transmission of the random access preamble signals 630 to the target BS with the transmissions of the UL communication signals 610 to the source BS. The UE may receive a TDM configuration or TDM pattern for multiplexing transmissions to the source BS and the target BS during the handover execution phase 203, as described in greater detail herein.

In an embodiment, the UE may use a certain tuning or switching time period 607 for switching from the source connection or the source communication link to the target connection or target link. Similarly, the UE may use a certain tuning or switching time period 609 for switching an RF frontend (e.g., the RF unit 414) of the UE from the target connection or the target communication link to the source connection or source link. The switching time periods 607 and 609 may vary depending on the UE's transceiver and/or RF architecture. In some instances, the switching time periods 607 and 609 may be the same. In some other instances, the switching time periods 607 and 609 may be different. The switching time periods 607 and 609 may be dependent on whether the handover is an intra-frequency handover, an inter-frequency handover, or an inter-RAT handover and/or the frequency operating ranges for the source cell and for the target cell. The source BS and/or the target BS may determine the TDM configuration by considering the UE's switching delays and/or capabilities as described in greater detail herein. As shown, while the UE is tuning the RF frontend or transmitting to the target BS, the UE's UL communication with the source BS is being interrupted as shown by the crosses 603.

In an embodiment, the UL communication signals 610 can include UL data and/or UL controls. The UL controls can include hybrid automatic repeat request (HARQ) feedbacks for DL data (e.g., carried in the DL communication signals 622) from the source BS. Each UL communication signals 610 or the RRC reconfiguration message 632 can be transmitted using a subframe (e.g., a slot or a transmission time interval (TTI)) spanning a number of frequency subcarriers in a frequency domain and a number of symbols in a time domain. The UE may transmit UL control via a PUCCH located in a frequency subband within a subframe and UL data via a PUSCH located in another frequency subband within the subframe. Similarly, each of the DL communication signals 622 and 644, the RAR 642, and the RRC reconfiguration message 620 can be transmitted using a subframe. The source BS or the target BS may transmit DL control or a scheduling grant via a PDCCH located in beginning time portion of a subframe and DL data via a PDSCH located in remaining portion of the subframe.

Compare to a convention handover, where a UE may stop communicating with a source BS during a handover execution phase 203, the scheme 600 allows the UE to continue to communicate with the source BS by time-multiplexing transmissions to the source BS and the target BS. Accordingly, the scheme 600 can minimize or reduce interruption to UL communications due to mobility.

Figure 7:
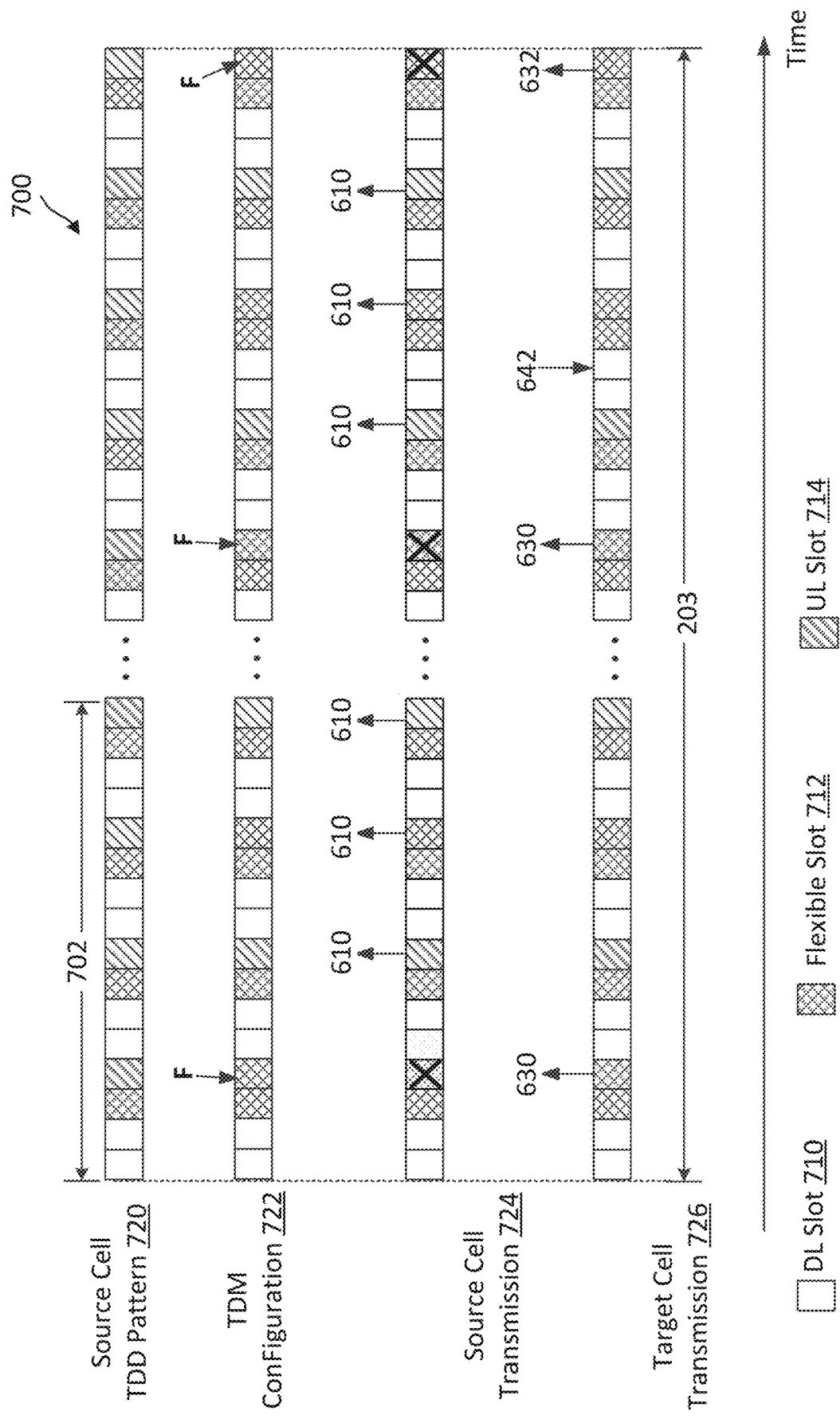
FIG. 7 illustrates a transmission sharing scheme for handover according to some embodiments of the present disclosure.

FIG. 7 illustrates a transmission sharing scheme 700 for handover according to some embodiments of the present disclosure. The scheme 700 may be employed by BSs such as the BSs 105, 305, and 500 and UEs such as the UEs 115, 315, and 400 in a network such as the networks 100 and 300. The scheme 700 is illustrated using the same handover scenario as in the scheme 600, and may use the same reference numerals as in FIG. 6 for simplicity sake. The scheme 700 provides a more detailed view of the TDM configurations during the handover execution phase 203.

The scheme 700 illustrates a TDD pattern 720 at the source cell, a TDM configuration 722 for the UE to multiplex transmissions to the source BS and the target BS during the handover execution phase 203, a transmission timeline 724 for UL transmissions from the UE to the source cell, and a transmission timeline 726 for UL transmissions from the UE to the target cell.

The source BS may configure the TDD pattern 720 for scheduling UL and/or DL communications with UEs. The TDD pattern 720 includes DL slots 710, flexible slots 712, and UL slots 714. The DL slots 710 are used for DL communications. The UL slots are used for UL communications. The flexible slots 712 can be used for UL or DL communications depending on scheduling needs. The source BS may configure the TDD pattern 720 such that each radio frame 702 may include a combination of DL slots 710, flexible slots 712, and UL slots 714.

The source BS may reconfigure some of the UL slots 714 to be flexible slots 712 for the TDM configuration 722 as marked by the letter "F". The TDM configuration 722 indicates a minimum number of UL slots 714 that may be used for UL communications with the source BS. The TDM configuration 722 may be configured based on certain restrictions and/or configurations associated with a certain NR TDD-UL-DL pattern. The TDM configuration 722 may be configured to include a certain periodicity setting enabling the UE to transmit random access preamble signals 630 to the target BS if an RAR 642 is not received within a RAR window (e.g., the RAR window 605). The source BS and the target BS coordinate with each other to use the flexible slots 712 for UL data transmission to the source BS and when not used by the target BS. In some embodiments, the source BS may include the TDM configuration 722 along with a handover command in an RRC reconfiguration message to the UE.

As shown, the UE transmits UL communication signals 610 to the source BS during UL slots 714 as configured by the TDM configuration 722. The UE transmits random access preamble signals 630 in the flexible slots 712. The UE does not transmit UL communications to the source BS during the flexible slots 712 that are used for UL communications with the target BS as marked by the crosses. Upon detecting the random access preamble signal 630$_{(2)}$ from the UE, the target BS may transmit an RAR 642 to the UE using a DL slot 710. After the UE establishes a connection with the target BS, the UE transmit an RRC reconfiguration completion message 632 (e.g., including a HO completion indication) in a UL slot 714.

While the scheme 700 is described in the context of a handover procedure, the scheme 700 can be applied to dual connectivity operations, where a UE is connected to two BSs at the same time. For example, in a dual connectivity scenario, a primary BS (e.g., the BS 305a) can configure the TDM configuration 722 to enable a UE (e.g., the UEs 315) to communicate with the primary BS and a corresponding secondary BS (e.g., the BS 305b).

In an embodiment, the multiplexing or sharing of transmissions to the source BS and the target BS may be used only during the handover execution phase 203 where the UE is performing a random access procedure with the target BS. After the UE establishes a connection with the target BS, the UE may switch UL data transmission to the target BS completely. In other words, the UE may not transmit UL data and/or UL control to the source BS. The target BS may request the source BS to stop data communications (e.g., transmit and/or receive) with the UE. The source BS may stop assigning packet data convergence protocol (PDCP) sequence numbers (SNs) to downlink service data units (SDUs) and stopping delivery of UL data to a core network and send a SN status transfer message to the target BS. The source BS may transmit any pending DL data before stopping the DL data transmission. The target BS may initiate a release of the source connection with the UE. In other words, the target BS may release the source BS at the end of the handover execution phase 203 when the UE is successfully connected to the target BS.

Figure 8:
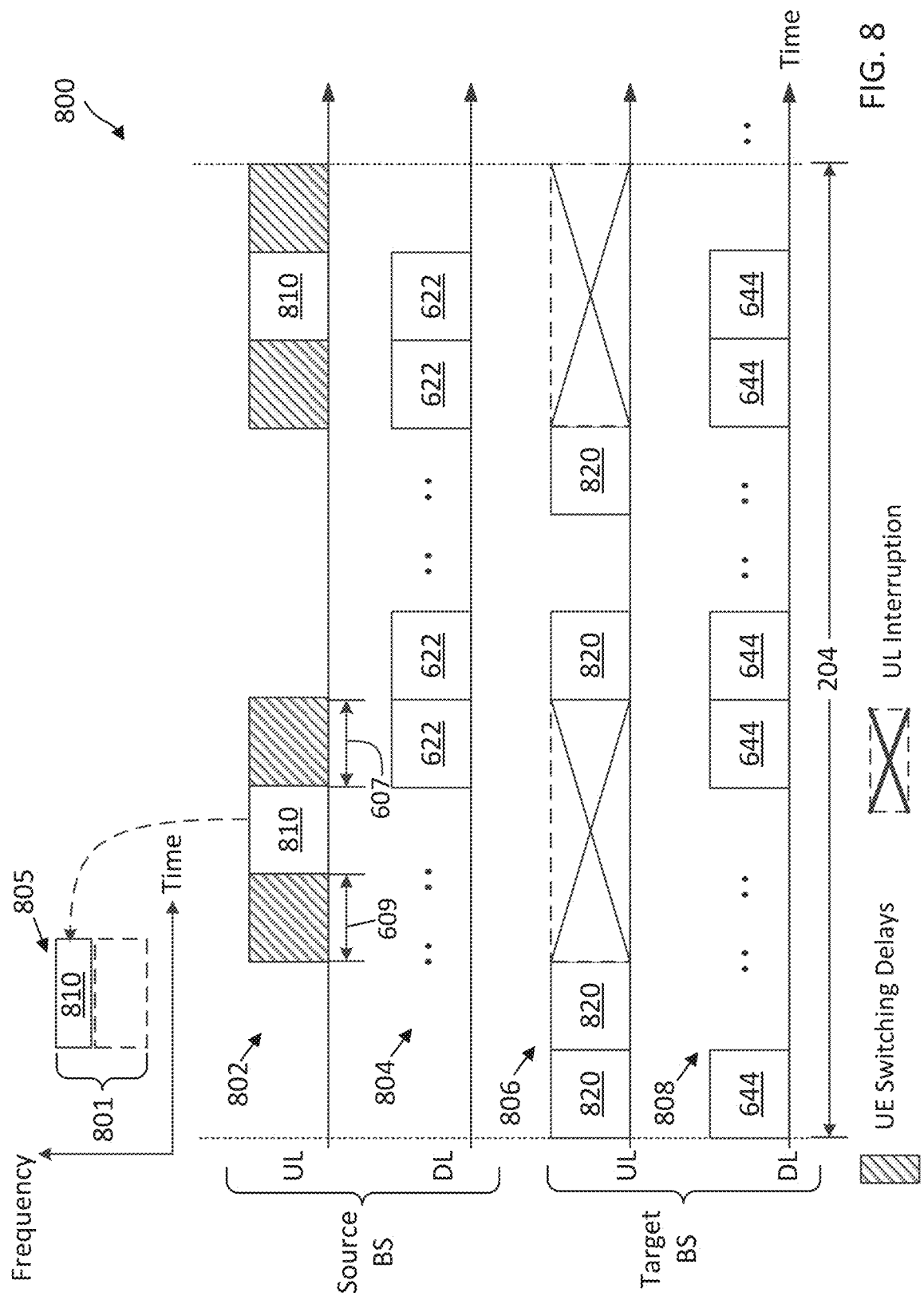
FIG. 8 illustrates a transmission sharing scheme for handover according to some embodiments of the present disclosure.

FIG. 8 illustrates a transmission sharing scheme 800 for handover according to some embodiments of the present disclosure. The scheme 800 may be employed by BSs such as the BSs 105, 305, and 500 and UEs such as the UEs 115, 315, and 400 in a network such as the networks 100 and 300. The scheme 800 is illustrated using the same handover scenario as in the method 200. Additionally, the scheme 800 is illustrated using the DL signal transmissions as in FIG. 6, and may use the same reference numerals as in FIG. 6 for simplicity sake. The scheme 800 provides a more detailed view of detailed view of a UE sharing a single transmit path for UL and/or DL communications between the UE and a source BS serving the UE and between the UE and a target BS during a handover completion phase 204. The scheme 800 illustrates transmission timelines 802, 804, 806, and 808. The transmission timeline 802 illustrates UL communications received by the source BS from the UE. The transmission timeline 804 illustrates DL transmissions by the source BS. The transmission timeline 806 illustrates UL communications received by the target BS from the UE. The transmission timeline 808 illustrates DL transmissions by the target BS.

The scheme 800 can be applied when the UE maintains the source connection to the source BS for a period of time after establishing a connection with the target BS. During the handover completion phase 204, the target link to the target BS may function as a primary link for UL data transmission. The source link to the source BS may be used for duplication of data. Thus, the TDM pattern (e.g., the TDM configuration 722) used during the handover execution phase 203 may not be optimal after the target connection is established. Thus, the scheme 800 can use a different TDM configuration than the TDM configuration used during a handover execution phase 203. In an embodiment, a TDM configuration for a handover execution phase 203 may configure about 80 percent (%) of transmission opportunities for the source BS and about 20% of the transmission opportunities to the target BS. In other words, the source connection or link has priority over the target connection or link. The sharing ratio or split between the target BS and the source BS may be different during a handover completion phase 204. For example, a TDM configuration for a handover execution phase 203 may configure about 20% of transmission opportunities for the source BS and about 80% of the transmission opportunities to the target BS. In other words, the target connection or link has priority over the source connection or link.

In an embodiment, the target BS may coordinate with the source BS to switch to a TDM configuration more suitable for use during the handover completion phase 204. The target BS may transmit an instruction to the UE requesting the TDM pattern or configuration switch. The instruction can be in a layer 1 (L1) message (e.g., a PDCCH downlink control information (DCI)), a L2 message (e.g., a MAC control element (CE)), or a layer 3 (L3) message (e.g., an RRC reconfiguration). In some instances, the UE may also initiate a TDM pattern switch, as described in greater detail herein.

As shown, the UE transmits UL communication signals 810 to the source BS and UL communication signals 820 signals to the target BS based on time-multiplexing. However, the UL communication signals 810 may only include UL controls or PUCCH, such as HARQ feedbacks for DL data (e.g., carried in the DL communication signals 622) received from the source BS, but not UL data or PUSCH. For example, the UE may communicate with the source BS over a frequency band 801 and the HARQ feedback may be transmitted in a subband within the frequency band 801 as shown by the subframe/slot configuration 805. On the other hand, the UL communication signals 820 transmitted to the target BS (e.g., the primary connection) may include UL data and/or UL controls including HARQ feedbacks for DL data received from the target BS.

Similar to the scheme 600, the target BS may determine the TDM configuration by considering switching delays (e.g., the switching time periods 607 and 609) of the UE. The UL communications in the primary connection with the target BS may be interrupted when the UE prepares for the link-switching and when the UE transmits the HARQ feedbacks (e.g., the UL communication signal 810) to the source BS as shown by the crosses. The transmission of the HARQ feedbacks to the source BS during the handover completion phase 204 can reduce DL data delays.

Figure 9:
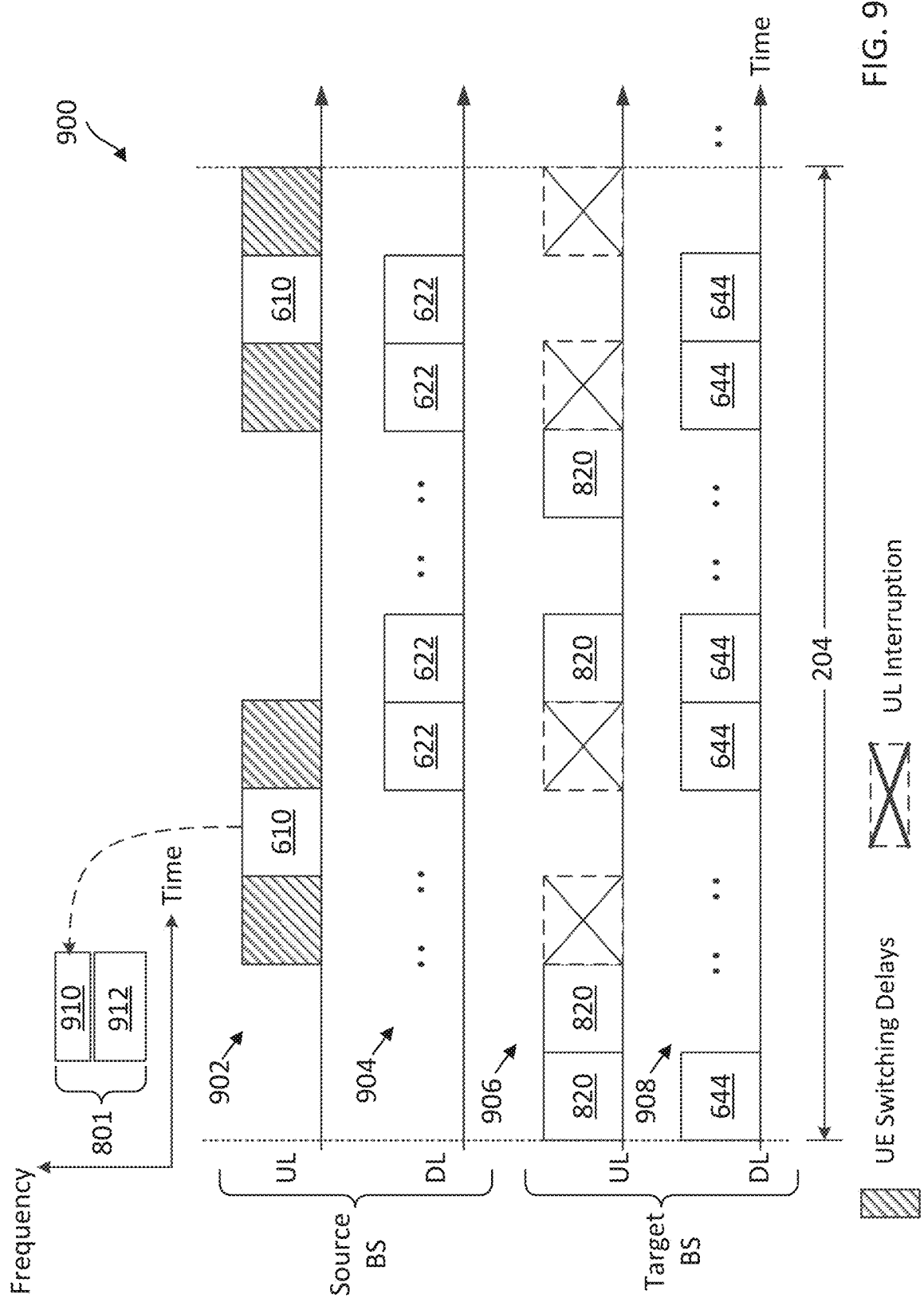
FIG. 9 illustrates a transmission sharing scheme for handover according to some embodiments of the present disclosure.

FIG. 9 illustrates a transmission sharing scheme 900 for handover according to some embodiments of the present disclosure. The scheme 900 may be employed by BSs such as the BSs 105, 305, and 500 and UEs such as the UEs 115, 315, and 400 in a network such as the networks 100 and 300. The scheme 900 is illustrated using the same handover scenario as in the method 200. Additionally, the scheme 900 is illustrated using the UL and DL signal transmissions as in FIG. 6, and may use the same reference numerals as in FIG. 6 for simplicity sake. The scheme 900 provides a more detailed view of detailed view of a UE sharing a single transmit path for UL and/or DL communications between the UE and a source BS serving the UE and between the UE and a target BS after executing a handover and during a handover completion phase 204. The scheme 900 illustrates transmission timelines 902, 904, 906, and 908. The transmission timeline 902 illustrates UL communications received by the source BS from the UE. The transmission timeline 904 illustrates DL transmissions by the source BS. The transmission timeline 906 illustrates UL communications received by the target BS from the UE. The transmission timeline 908 illustrates DL transmissions by the target BS. The scheme 900 is substantially similar to the scheme 800, but allows a UE to continue to transmit UL data to the source BS in addition to HARQ feedbacks during the handover completion phase 204.

As shown, the UE transmits UL communication signals 610 to the source BS and transmit UL communication signals 820 signals to the target BS based on time-multiplexing. The UL communication signals 610 includes UL control 910 (e.g., the UL communication signal 810) or PUCCH and UL data 912 or PUSCH. The UL control can include HARQ feedbacks for DL data received from the source BS. For example, the UE may transmit UL control 910 in a subband within the frequency band 801 and UL data 912 in another subband within the frequency band 801. Since the UE can simultaneously transmit UL controls 910 and UL data 912 to the source BS, the amount of UL interruptions (e.g., shown by the crosses) may be reduced compared to the scheme 800. Further, in some instances, the UE may radio link control (RLC) status reports via PUSCH or as UL data to the source BS. In RLC, retransmissions may occur in the MAC layer when no acknowledgement is received. Thus, the transmission of the UL data 912 or RLC status reports can further reduce DL data delays compare to the scheme 800.

As shown above, the schemes 600-900 configure various TDM patterns or configurations to enable a UE using a single transmit path to simultaneously connect to a source BS and a target BS during a handover. Thus, the schemes 600-900 may reduce interruptions to UL communications and reduce delays in DL communications. In addition, the schemes 600-900 can adjust the TDM patterns based on traffic needs, for example, to gradually transition from a source BS (e.g., the BSs 105, 305, and 500) to a target BS (e.g., the BSs 105, 305, and 500). In some embodiments, a source BS may determine whether the TDM sharing may be applicable based on the service requirements (e.g., QoS parameters) of a UE (e.g., the UEs 115, 315, and 400). For example, the TDM sharing may be applied when the service requirement delay budget is less than the handover interruption time (e.g., about 50 ms) and greater than a UL subframe or slot (e.g., the UL slots 714) interval (e.g., about 1 ms) such that some of the UL subframes or slots can be used for transmission to the target BS.

While the schemes 600-900 are described in the context of handover, similar TDM sharing mechanisms may be applied to dual connectivity as shown in the network 300 described above with respect to FIG. 3. For example, the UE 315 may have a single transmit path and may transmit UL communication signals (e.g., UL data and/or UL control) to the BSs 305a and 305b over the communication links 310a and 310b, respectively, using TDM. The BS 305a functioning as a master or primary BS may configure TDM patterns for transmission over the links 310a and 310b. The BS 305a may configure the TDM patterns based on channel qualities and/or traffic loading over the links 310a and 310b. The channel qualities may include uplink channel information measured by the BS 305a and/or the BS 305b and downlink channel information reported by the UE 315. The BS 305a may instruct the UE 315 to switch to a different TDM pattern or stop applying a certain TDM pattern. In some embodiments, the UE 315 may also determine a TDM pattern based on channel qualities measured by the UE 315. The UE 315 may request the BS 305a and the BS 305b to switch to the determined TDM pattern.

Figure 10:
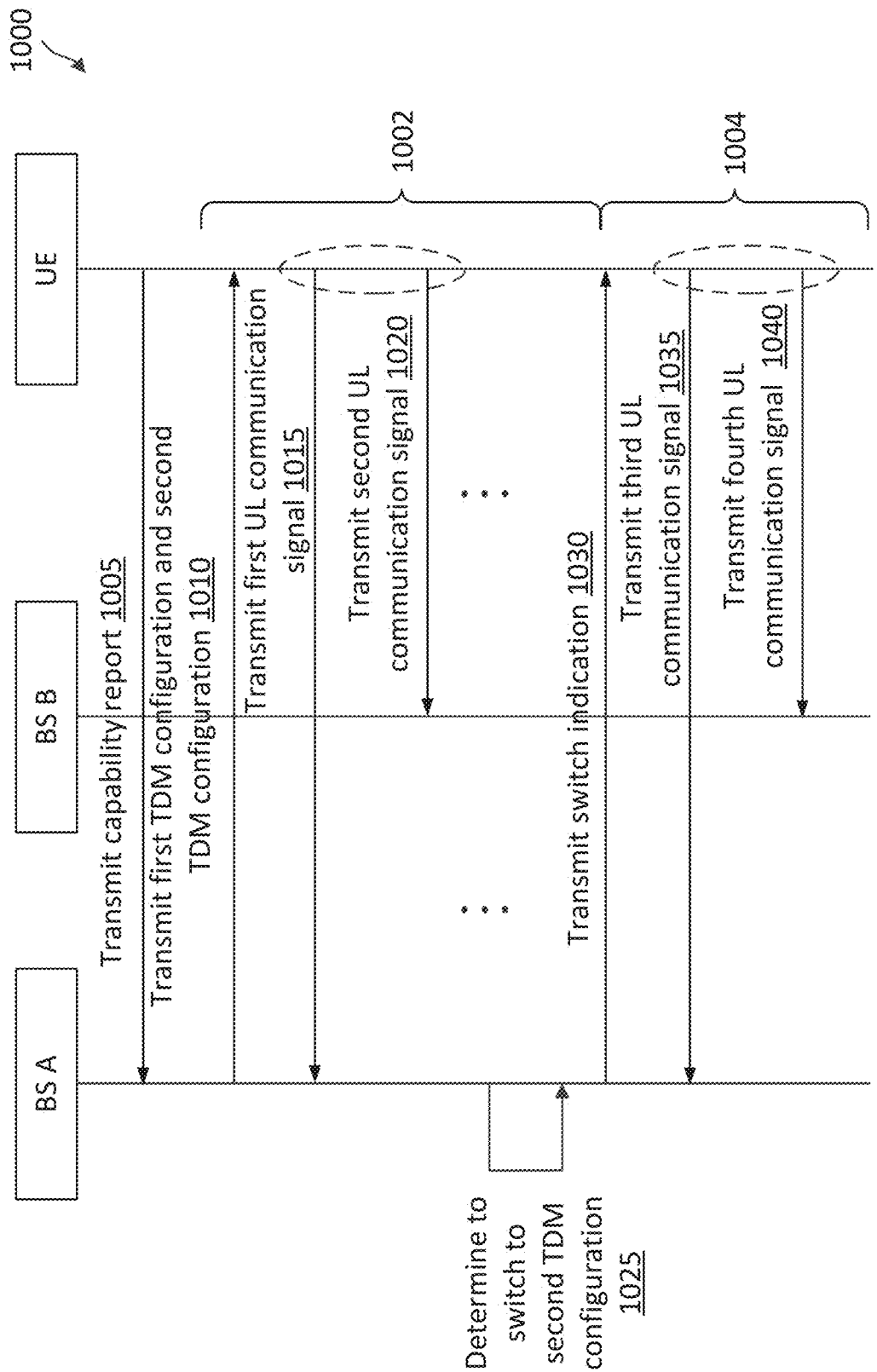
FIG. 10 is a signaling diagram illustrating a communication method according to some embodiments of the present disclosure.

FIG. 10 is a signaling diagram illustrating a communication method 1000 according to some embodiments of the present disclosure. The method 1000 is implemented by a BS A, a BS B, and a UE in a network. The BS A and the BS B are similar to the BSs 105, 305, and 500. The UE is similar to the UEs 115, 315, and 400. The network is similar to the network 100. The method 1000 may use similar mechanisms as in the method 200 and the schemes 600, 700, 800, and 900 described above with respect to FIGS. 2, 6, 7, 8, and 9, respectively. Steps of the method 1000 can be executed by computing devices (e.g., a processor, processing circuit, and/or other suitable component) of the BS A, BS B, and the UE. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

In the method 1000, the UE has a connection with the BS A over a first communication link (e.g., the links 310) and a connection with the BS B over a second communication link (e.g., the links 310). The method 1000 may be implemented during an MBB handover or dual connectivity (e.g., NR-NR DC, EN-DC, NGEN-DC, or NE-DC). For MBB handover, one the of BS A or the BS B may be a source BS serving the UE and the other BS A or BS B may be a target BS for the handover. For dual connectivity, one of the BS A or the BS B may be a primary BS and the other BS A or BS B may be a secondary BS.

At step 1005, the UE transmits a UE capability report to the BS A (e.g., a primary BS of the UE). The capability report may indicate a transmission switching or tuning delay (e.g., the switching time periods 607 and 609), a frequency range supported by the UE, or a handover type supported by the UE. Some examples of frequency range may include a frequency range 1 (FR1) in the sub-6 GHz and a frequency range 2 (FR) in the mmWay. Some examples of handover type may include synchronous handover, where a source BS and a target BS operate in synchronous mode, or asynchronous handover, where a source BS and a target BS operate in asynchronous mode. The report may include whether the UE can support inter-frequency handover, intra-frequency handover, and/or inter-RAT handover.

At step 1010, the BS A transmits a first TDM configuration and a second TDM configuration (e.g., the TDM configuration 722), for example, via an RRC configuration. Each of the first TDM configuration and the second TDM configuration may include a time pattern for sharing a single transmit path for transmission over the first communication link to the BS A and the second communication link to the BS B. The BS A may determine the first TDM configuration based on various factors, such as service requirements of the UE, capabilities of the UE, traffic loading over the first communication link and the second communication link, and/or channel conditions or qualities (e.g., UL and/or DL channel information) over the first communication link and the second communication link. Each of the first TDM configuration and the second TDM configuration may include a first set of transmission slots (e.g., the UL slots 714 and the flexible slots 712) over a certain time period (e.g., the frame 702) assigned for transmissions over the first communication link and a second set of transmission slots over the time period assigned for transmissions over the second communication link. For instances, the first TDM configuration may include one transmission slot every 5 ms for transmissions over the first communication link and one transmission slot every 10 ms for transmissions over the second communication link. The second TDM configuration may include one transmission slot every 10 ms for transmissions over the first communication link and one transmission slot every 5 ms for transmissions over the second communication link.

At step 1015, the UE transmits a first UL communication signal (e.g., the UL communication signals 610, 810, and 820, PRACH signals 630, RRC messages 632) to the BS A via the first communication link based on the first TDM configuration, for example, using a transmission slot assigned for transmission over the first communication link.

At step 1020, the UE transmits a second UL communication signal (e.g., the UL communication signals 610, 810, and 820, PRACH signals 630, RRC messages 632) to the BS B via the second communication link based on the first TDM configuration, for example, using a transmission slot assigned for transmission over the second communication link. In other words, the first and second UL communication signals are time-multiplexed as shown by the dashed oval.

At step 1025, after a time period 1002, the BS A determines to switch to the second TDM configuration, for example, based on changes in scheduling needs, traffic loading, and/or channel conditions.

At step 1030, the BS transmits an indication to switch from the first TDM configuration to the second TDM configuration, for example, via L1 signaling in a PDCCH DCI, L2 signaling in a MAC CE, or L3 signaling via an RRC configuration.

At step 1035, the UE transmits a third UL communication signal (e.g., the UL communication signals 610, 810, and 820, PRACH signals 630, RRC messages 632) to the BS A via the first communication link based on the second TDM configuration.

At step 1040, the UE transmits a fourth UL communication signal (e.g., the UL communication signals 610, 810, and 820, PRACH signals 630, RRC messages 632) to the BS B via the second communication link based on the second TDM configuration. In other words, the first and second UL communication signals are time-multiplexed as shown by the dashed oval. The second TDM configuration may be used during a time period 1004.

Subsequently, the BS A can switch to a third TDM configuration different from the first and second TDM configurations based on changes in scheduling needs, traffic loading, and/or channel conditions.

In an embodiment, when the method 1000 is implemented during a handover, the period 1002 may correspond to a handover execution phase 203 and the period 1004 may correspond to a handover completion phase 204.

In an embodiment, when the method 1000 is implemented during dual connectivity, the UE further receives a dual connectivity configuration from the BS A, for example, indicating a configuration for communicating with the BS B. In such an embodiment, the first, second, third, and fourth communication signals are transmitted further based on the dual connectivity configuration.

Figure 11:
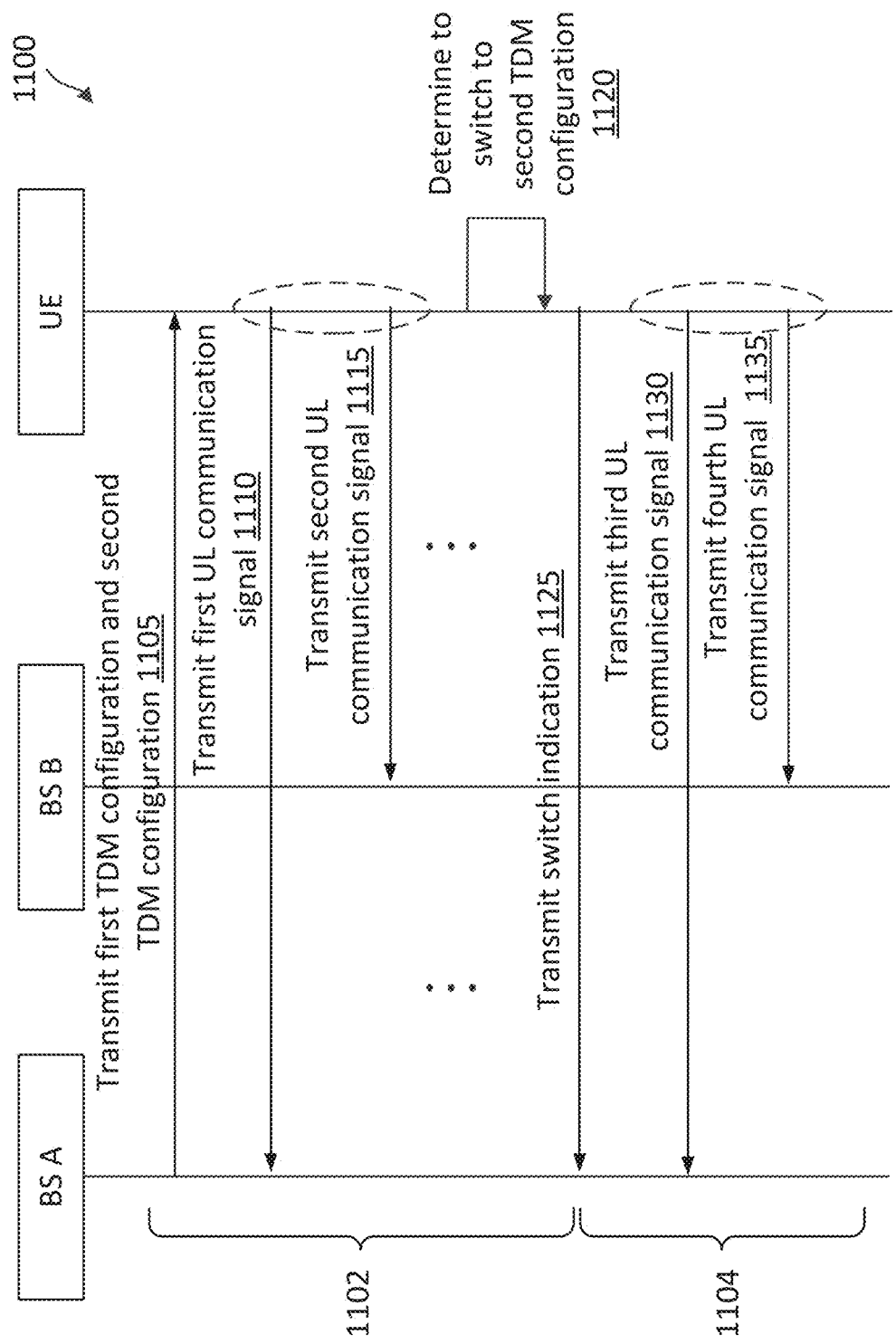
FIG. 11 is a signaling diagram illustrating a communication method according to some embodiments of the present disclosure.

FIG. 11 is a signaling diagram illustrating a communication method 1100 according to some embodiments of the present disclosure. The method 1100 is implemented by a BS A, a BS B, and a UE in a network. The BS A and the BS B are similar to the BSs 105, 305, and 500. The UE is similar to the UEs 115, 315, and 400. The network is similar to the network 100. The method 1100 may use similar mechanisms as in the method 200 and the schemes 600, 700, 800, and 900 described above with respect to FIGS. 2, 6, 7, 8, and 9, respectively. The method 1100 is substantially similar to the method 1000, but illustrates a scenario where the UE determines to switch a TDM configuration instead of the BS A. Steps of the method 1100 can be executed by computing devices (e.g., a processor, processing circuit, and/or other suitable component) of the BS A, BS B, and the UE. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

Similar to the method 1000, in the method 1100, the UE has a connection with the BS A over a first communication link (e.g., the links 310) and a connection with the BS B over a second communication link (e.g., the links 310), for example, during an MBB handover or dual connectivity operations.

At step 1105, the BS A transmits a first TDM configuration and a second TDM configuration (e.g., the TDM configuration 722). Each of the first TDM configuration and the second TDM configuration may include a time pattern for sharing a single transmit path for transmission over the first communication link to the BS A and the second communication link to the BS B. For instances, the first TDM configuration may include one transmission slot every 5 ms for transmissions over the first communication link and one transmission slot every 10 ms for transmissions over the second communication link. The second TDM configuration may include one transmission slot every 10 ms for transmissions over the first communication link and one transmission slot every 5 ms for transmissions over the second communication link. The BS A may use similar mechanisms as described in the method 1000 to determine the first TDM configuration.

At step 1110, the UE transmits a first UL communication signal (e.g., the UL communication signals 610, 810, and 820, PRACH signals 630, RRC messages 632) to the BS A via the first communication link based on the first TDM configuration, for example, using a transmission slot assigned for transmission over the first communication link.

At step 1115, the UE transmits a second UL communication signal (e.g., the UL communication signals 610, 810, and 820, PRACH signals 630, RRC messages 632) to the BS B via the second communication link based on the first TDM configuration, for example, using a transmission slot assigned for transmission over the second communication link. In other words, the first and second UL communication signals are time-multiplexed as shown by the dashed oval.

At step 1120, after a time period 1102, the UE determines to switch to the second TDM configuration, for example, based on channel measurements performed by the UE, QoS requirement associated with the UE, and/or a transmit capability of the UE. For example, the UE may determine that the channel quality over the second communication link is higher than the channel quality over the first communication link, and thus the second TDM configuration may be more suitable.

At step 1125, the UE transmits an indication to switch from the first TDM configuration to the second TDM configuration, for example, via a MAC CE. In some instances, the UE may transmit the switch indication to the BS A and the BS A may notify the BS B of the switch.

At step 1130, the UE transmits a third UL communication signal (e.g., the UL communication signals 610, 810, and 820, PRACH signals 630, RRC messages 632) to the BS A via the first communication link based on the second TDM configuration.

At step 1135, the UE transmits a fourth UL communication signal (e.g., the UL communication signals 610, 810, and 820, PRACH signals 630, RRC messages 632) to the BS B via the second communication link based on the second TDM configuration. In other words, the first and second UL communication signals are time-multiplexed as shown by the dashed oval. The second TDM configuration may be used during a time period 1004.

In some embodiments, when the method 1100 is implemented during a handover, the period 1102 may correspond to a handover execution phase 203 and the period 1104 may correspond to a handover completion phase 204.

In an embodiment, when the method 1000 is implemented during dual connectivity, the UE further receives a dual connectivity configuration from the BS A, for example, indicating a configuration for communicating with the BS B. In such an embodiment, the first, second, third, and fourth communication signals are transmitted further based on the dual connectivity configuration.

In general, a network such as the networks 100 and 300 may employ any suitable combination of the schemes 600, 700, 800, and 900 and the methods 1000 and 1100 to enable a UE (e.g., the UEs 115, 315, and 400) having a single transmit path to simultaneously maintain two or more connections with two or more BSs (e.g., the BSs 105, 305, and 500) by applying various TDM patterns. The UE or any of the connected BS may determine to switch to a different TDM pattern based on service requirements, traffic loading, scheduling needs, channel conditions, and/or UE capabilities. The UE or any of the connected BS may perform any suitable number of TDM pattern switches (e.g., about 2, 3, 4 or more).

In an embodiment, an NR RRC reconfiguration message includes a TDM pattern configuration information element (IE). The TDM pattern configuration IE may include a setup parameter, a release parameter, and/or one or more TDM patterns (e.g., a TDM pattern 1 and a TDM pattern 2). The TDM patterns can be similar to the TDM configuration 722. The setup parameter may initiate a TDM configuration based on a TDM pattern in the TDM pattern configuration IE. The release parameter may disable a TDM pattern in the TDM pattern configuration IE.

In an embodiment, when a UE receives an RRC reconfiguration message (e.g., the RRC reconfiguration message 620) including a TDM pattern configuration IE with one or more TDM patterns (e.g., a TDM pattern 1 and a TDM pattern 2), the UE applies the TDM pattern 1 after processing of the RRC reconfiguration message and no explicit indication is required to be sent to the UE to initiate the used of the TDM pattern 1. To switch from the TDM pattern 1 to the TDM pattern 2, the UE may require an explicit instruction (e.g., via a MAC CE). In an example of an MBB handover, a target BS may transmit an instruction to instruct the UE to switch to the TDM pattern 2. In an example of dual connectivity, a master BS or a master cell group (MCG) may transmit an instruction to instruct the UE to switch to the TDM pattern 2.

In some embodiments, TDM pattern configuration IEs are defined for use with NR and/or LTE to allow for TDM pattern switching. For example, an NR TDM pattern configuration IE is defined for use during NE-DC, NR-NR DC, NR to NR handover, and/or NR to enhanced (eLTE) handover. Similarly, an LTE TDM pattern configuration IE is defined for use during NGEN-DC and/or eLTE to NR handover.

In an embodiment, a MAC CE is defined to support TDM pattern switches. For example, the MAC CE may include a logical channel identifier (LCID) for a downlink-shared channel (DL-SCH) and corresponding TDM patterns.

In an embodiment, a UE capability includes a UE capability IE. The UE capability IE is defined to support the sharing of a single transmit path for multiple simultaneous connections. For example, a UE capability IE may include a list of NR carrier aggregation (CA), multi-RAT dual connectivity (MR-DC) band combinations, and/or band combinations for single transmit MBB handover.

In an embodiment, a UE capability IE includes a single UL transmission parameter (e.g., one bit in length) indicating that the UE does not support simultaneous UL transmissions. The UE may set this bit for certain band combinations to indicate that the UE does not support simultaneous UL transmission for certain band combinations. If the bit is set for a particular band combination, the bit applies to all fallback band combinations of this band combination as being allowed to set the bit and does not apply to any other fallback band combinations. In other words, when the bit is set, the UE does not support simultaneous UL transmission for fallback band combinations associated with the certain band combinations.

In an embodiment, a UE capability IE includes a TDM pattern parameter indicating whether the UE supports TDM for single UL transmission associated functionality. Support is conditionally mandatory for UEs that do not support dynamic power sharing and or UEs that indicate single UL for any band combination, and optional otherwise.

In an embodiment, a UE capability IE includes a UL switching time from ETRURA to NR indicating support of switching type between LTE UL and NR UL for EN-DC with LTE-NR coexistence in UL sharing from UE perspective. A switching time type 1 indicates a UE supports switching within less than 0 microsecond (µs). A switching time type 2 indicates a UE supports switching within less than 20 µs. It is mandatory to report switching time type 1 or type 2 if a UE supports LTE and NR UL transmission in a shared carrier via TDM only or LTE and NR UL transmission in a shared carrier via FDM or TDM.

In an embodiment, a UE capability IE includes a UL switching time types for different types of HO, i.e. sync Intra-Freq (FR1→FR1), sync Intra-Freq (FR2→FR2), sync Inter-Freq (FR1→FR2), sync Inter-Freq (FR2→FR1), sync Inter-Freq(FR1(f1)→FR1(f2)), sync sync Inter-Freq(FR2 (f1)→FR2(f2)), async HO for the different Intra-Freq, Inter-Freq HOs. UL Switching Time Types can be categorized into fewer levels than the possible types of HO combinations, by considering the upper limit for UL switching time among the different types of HO in different categories.

Figure 12:
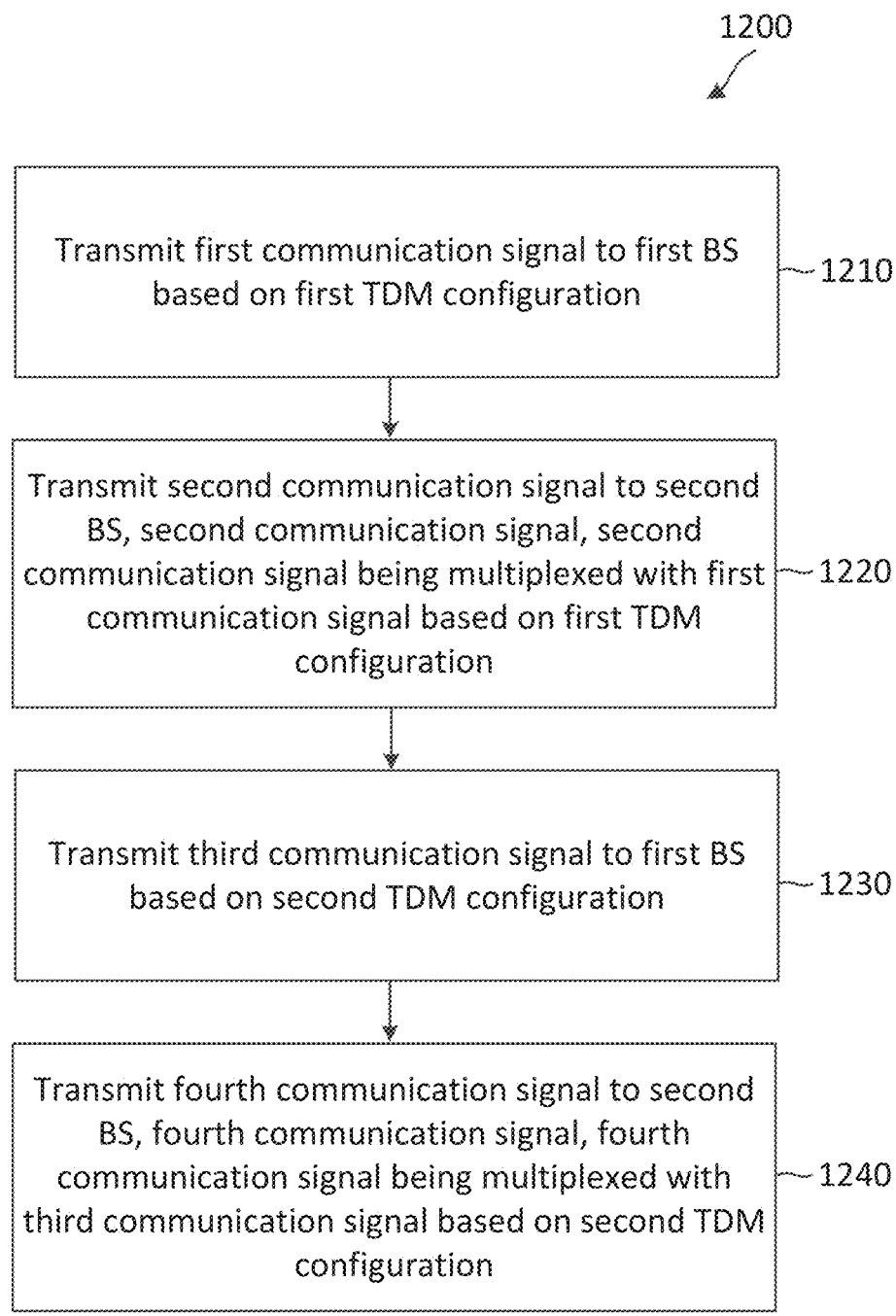
FIG. 12 is a flow diagram of a communication method according to some embodiments of the present disclosure.

FIG. 12 is a flow diagram of a communication method 1200 according to some embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115, UE 315, or UE 400, may utilize one or more components, such as the processor 402, the memory 404, the handover module 408, the dual link communication module 409, the transceiver 410, the modem 412, and the one or more antennas 416, to execute the steps of method 1200. The method 1200 may employ similar mechanisms as in the schemes 600, 700, 800, and 900 described with respect to FIGS. 6, 7, 8, and 9, respectively, and/or the methods 200, 1000, and 1100 described with respect to FIGS. 2, 10, and 11, respectively As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes transmitting, by a UE to a first BS (e.g., the BSs 105, 305, and 500), a first communication signal (e.g., the UL communication signals 610, 810, and 820, PRACH signals 630, RRC messages 632) based on a first TDM configuration (e.g., the TDM configuration 722).

At step 1220, the method 1200 includes transmitting, by the UE to a second BS (e.g., the BSs 104, 305, and 500) different from the first BS, a second communication signal, the second communication signal being multiplexed with the first communication signal based on the first TDM configuration.

At step 1230, the method 1200 includes transmitting, by the UE to the first BS, a third communication signal based on a second TDM configuration different from the first TDM configuration. The first TDM configuration and the second TDM configuration can be associated with a handover from the first BS to the second BS, as described in greater detail with reference to the handover procedure as discussed with reference to FIGS. 4-11.

At step 1240, the method 1200 includes transmitting, by the UE to the second BS, a fourth communication signal, the fourth communication signal being multiplexed with the third communication signal based on the second TDM configuration.

In an embodiment, the UE further receives an instruction to switch from the first TDM configuration to the second TDM configuration. In an embodiment, the UE further transmits an instruction to switch from the first TDM configuration to the second TDM configuration. Whether receiving or transmitting, the UE can receive and/or transmit the instruction via, for example, at least one of DCI signaling, MAC CE signaling, or RRC signaling, or any combination thereof.

In an embodiment, after the UE has switched from the first TD configuration to the second TDM configuration based on a successful handover from the first BS to the second BS, the UE further determines the second TDM configuration based on at least one of a link quality associated with the first BS, a link quality associated with the second BS, a quality of service (QoS) requirement associated with the UE, or a transmit capability of the UE, or any combination thereof. After the UE determines the second TDM configuration, the UE further transmits the second TDM configuration to at least one of the first BS or the second BS.

In an embodiment, the UE further transmits a capability report including at least one of a transmission switching delay (e.g., the switching time periods 607 and 609) associated with the UE, a frequency range supported by the UE, or a handover type supported by the UE. In an embodiment, at least one of the first TDM configuration or the second TDM configuration is based at least in part on the capability report.

In an embodiment, the UE further receives, from the first BS (e.g., a source BS), an instruction (e.g., the RRC reconfiguration message 620) to handover from the first BS to the second BS (e.g., a target BS). The instruction includes at least one of the first TDM configuration or the second TDM configuration. The UE transmits the second communication signal by transmitting, to the second BS in response to the received instruction, a random access preamble signal (e.g., the PRACH signal 630) to establish a first connection with the second BS while maintaining a second connection with the first BS. The UE transmits the first communication signal (e.g., the UL communication signals 610) by transmitting, to the first BS based on the second connection, at least one of uplink data or a feedback for downlink data associated with the first BS after receiving the instruction (e.g., during the handover execution phase 203).

In an embodiment, the UE further transmits, by the UE to the second BS, a handover completion indication (e.g., the RRC reconfiguration message 632). The UE transmits the third communication signal by transmitting, to the first BS, the third communication signal after transmitting the handover completion indication (e.g., during the handover completion phase 204). The UE transmits the transmitting the third communication signal by transmitting, by the UE to the first BS, at least one of uplink data (e.g., the UL data 912) or a feedback (e.g., the UL control 910 including a HARQ feedback) for downlink data associated with the first BS.

In an embodiment, the UE further receive an instruction to disable the second TDM configuration for transmission to at least one of the first BS or the second BS.

In an embodiment, the UE transmits the first and second communication signal in the same frequency band. In an embodiment, the UE transmits the first and second communication signal in different frequency bands.

In an embodiment, the UE transmits the first and second communication signal using the same RATs (e.g., NR or LTE). In an embodiment, the UE transmits the first and second communication signal using different RATs (e.g., NR and LTE).

In an embodiment, the UE further receives a dual connectivity configuration for performing dual connectivity communications with the first BS and the second BS, wherein the first communication signal, the second communication signal, the third communication signal, and the fourth communication signal are transmitted further based on the dual connectivity configuration.

Figure 13:
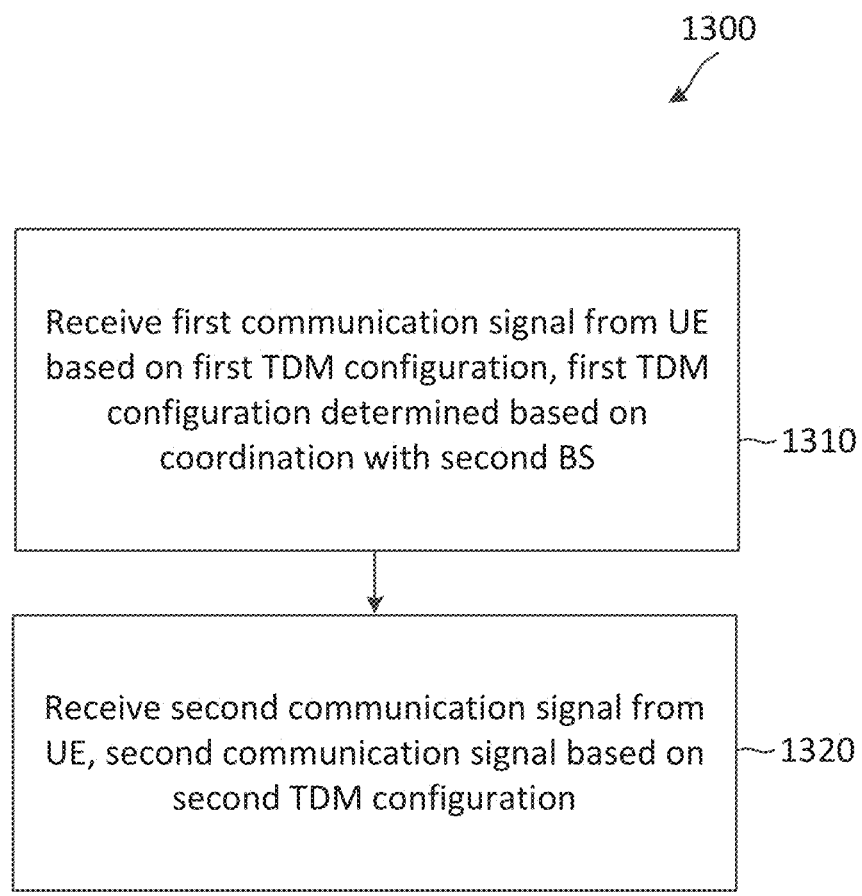
FIG. 13 is a flow diagram of a communication method according to some embodiments of the present disclosure.

FIG. 13 is a flow diagram of a communication method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the BS 105, BS 305, or BS 500, may utilize one or more components, such as the processor 502, the memory 504, the handover module 508, the dual link communication module 509, the transceiver 510, the modem 512, and the one or more antennas 516, to execute the steps of method 1300. The method 1300 may employ similar mechanisms as in the schemes 600, 700, 800, and 900 described with respect to FIGS. 6, 7, 8, and 9, respectively, and/or the methods 200, 1000, and 1100 described with respect to FIGS. 2, 10, and 11, respectively As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes receiving, by a first BS from a UE (e.g., the UEs 115, 315, and 400), a first communication signal (e.g., the UL communication signals 610, 810, and 820, PRACH signals 630, RRC messages 632) based on a first TDM configuration (e.g., the TDM configuration 722), the first TDM configuration determined based on a coordination with a second BS different for a handover of the UE. In some instances, the first BS corresponds to a source BS in the handover and the second BS corresponds to a target BS in handover. In some other instances, the first BS corresponds to a target BS in the handover and the second BS corresponds to a source BS in handover.

At step 1320, the method 1300 includes receiving, by the first BS from the UE, a second communication signal based on a second TDM configuration different from the first TDM.

In an embodiment, the first BS further transmits an instruction to switch from the first TDM configuration to the second TDM configuration. In some instances, the first BS corresponds to a source BS in the handover and the second BS corresponds to a target BS in handover. In some other instances, the first BS corresponds to a target BS in the handover and the second BS corresponds to a source BS in handover. In other words, a target BS or a source BS may instruct the UE to switch from the first TDM configuration to the second TDM configuration.

In an embodiment, the first BS further receives an instruction to switch from the first TDM configuration to the second TDM configuration.

In an embodiment, the first BS further coordinates, with the second BS, to determine at least one of the first TDM or the second TDM configuration based on at least one of QoS requirement associated with the UE, a capability of the UE, a traffic loading associated with a first communication link (e.g., the communication link 310a) between the first BS and the UE, a traffic loading associated with a second communication link (e.g., the communication link 310b) between the UE and the second BS, a link quality associated with the first communication link, or a link quality associated with the second communication link, or any combination thereof.

In an embodiment, the coordination is based on the capability of the UE. The first BS further receives, from the UE, a report indicating the capability of the UE. The report includes at least one of a transmission switching delay type (e.g., switching time type 1 or 2, as discussed above, where a switching time type can map to a range for a switching time, such as switching time periods 607 and 609) associated with the UE, a frequency range supported by the UE, or a handover type supported by the UE.

In an embodiment, the first BS further transmits, to the UE, an instruction (e.g., the RRC reconfiguration message 620) to handover from the first BS to the second BS. In such an embodiment, the first BS corresponds to a source BS serving the UE and the second BS corresponds to a target BS for the handover. The first BS receives the first communication signal by receiving, the UE, at least one of uplink data (e.g., the UL data 912) or a feedback (e.g., the UL control 910 including a HARQ feedback) for downlink data after transmitting the instruction. In an embodiment, the instruction includes at least one of the first TDM configuration or the second TDM configuration.

In an embodiment, the first BS receives, from the second BS, a request to handover the UE from the second based station to the first BS. In such an embodiment, the second BS corresponds to a source BS serving the UE and the first BS corresponds to a target BS for the handover. The first BS further receives the first communication signal including a random access preamble signal (e.g., the PRACH signal 630) after receiving the request. In an embodiment, the first BS further receives receiving, from the UE, a handover completion indication (e.g., the RRC reconfiguration message 632). The first BS further receives the second communication signal by receiving, from the UE, at least one of uplink data or a feedback for downlink data after receiving the handover completion indication.

In an embodiment, the first BS further transmits an instruction to disable the second TDM configuration for communication with the UE.

In an embodiment, the first BS further coordinates, with the second BS, to determine a dual connectivity configuration for performing dual connectivity communications with the UE, where the first communication signal and the second communication signal are further received based on the dual connectivity configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    transmitting, by a user equipment (UE) to a first base station (BS), a first communication signal based on a first time-division multiplexed (TDM) configuration;
    transmitting, by the UE to a second BS different from the first BS, a second communication signal, the second communication signal being multiplexed with the first communication signal based on the first TDM configuration;
    transmitting, by the UE to the first BS or the second BS, an instruction to switch from the first TDM configuration to a second TDM configuration different from the first TDM configuration, wherein the first TDM configuration and the second TDM configuration are associated with a handover from the first BS to the second BS;
    transmitting, by the UE to the first BS, a third communication signal based on the second TDM configuration; and
    transmitting, by the UE to the second BS, a fourth communication signal, the fourth communication signal being multiplexed with the third communication signal based on the second TDM configuration.

2. The method of claim 1, wherein the transmitting the instruction to switch from the first TDM configuration to the second TDM configuration comprises:
    transmitting, by the UE via at least one of uplink control information (UCI) signaling, medium access control (MAC) control element (CE) signaling, or radio resource control (RRC) signaling, the instruction to switch from the first TDM configuration to the second TDM configuration.

3. The method of claim 2, further comprising:
    switching, by the UE, from the first TDM configuration to the second TDM configuration based on a successful handover from the first BS to the second BS;
    determining, by the UE, the second TDM configuration based on at least one of a link quality associated with the first BS, a link quality associated with the second BS, a quality of service (QoS) requirement associated with the UE, or a transmit capability of the UE; and
    transmitting, by the UE to at least one of the first BS or the second BS, the determined second TDM configuration.

4. The method of claim 1, further comprising:
    transmitting, by the UE, a capability report including at least one of a list of transmission switching delay types associated with the UE, a frequency range supported by the UE, or a handover type supported by the UE.

5. The method of claim 4, wherein at least one of the first TDM configuration or the second TDM configuration is based at least in part on the capability report.

6. The method of claim 1, further comprising:
    receiving, by the UE from the first BS, an instruction for the handover from the first BS to the second BS, the instruction including at least one of the first TDM configuration or the second TDM configuration,
    wherein the transmitting the second communication signal includes:
        transmitting, by the UE to the second BS in response to the received instruction, a random access preamble signal to establish a second connection with the second BS while maintaining a first connection with the first BS.

7. The method of claim 6, wherein the transmitting the first communication signal includes:
    transmitting, by the UE to the first BS based on the first connection, at least one of uplink data or a feedback for downlink data associated with the first BS after receiving the instruction.

8. The method of claim 6, further comprising:
transmitting, by the UE to the second BS, a handover completion indication, wherein the transmitting the third communication signal includes:
transmitting, by the UE to the first BS, the third communication signal after transmitting the handover completion indication.

9. The method of claim 8, wherein the transmitting the third communication signal includes:
transmitting, by the UE to the first BS, at least one of uplink data or a feedback for downlink data associated with the first BS.

10. The method of claim 1, further comprising:
receiving, by the UE, an instruction to disable the second TDM configuration for transmission to at least one of the first BS or the second BS.

11. A method of wireless communication, comprising:
receiving, by a first BS from a user equipment (UE), a first communication signal based on a first time-division multiplexed (TDM) configuration, the first TDM configuration determined based on a coordination with a second BS for a handover of the UE;
receiving, by the first BS from the UE, an instruction to switch from the first TDM configuration to a second TDM configuration different from the first TDM configuration, the second TDM configuration associated with the handover of the UE; and
receiving, by the first BS from the UE, a second communication signal based on the second TDM configuration.

12. The method of claim 11,
wherein the first BS is a target BS or a source BS of the UE for the handover.

13. The method of claim 11, wherein the receiving the instruction to switch from the first TDM configuration to the second TDM configuration comprises:
receiving, by the first BS from the UE via at least one of uplink control information signaling (UCI), medium access control (MAC) control element (CE) signaling, or radio resource control (RRC) signaling, the instruction to switch from the first TDM configuration to the second TDM configuration.

14. The method of claim 11, further comprising:
coordinating, by the first BS with the second BS, to determine at least one of the first TDM configuration or the second TDM configuration based on at least one of quality of service (QoS) requirement associated with the UE, a capability of the UE, a traffic loading associated with a first communication link between the first BS and the UE, a traffic loading associated with a second communication link between the UE and the second BS, a link quality associated with the first communication link, or a link quality associated with the second communication link.

15. The method of claim 14, wherein the coordinating is based on the capability of the UE, and wherein the method further comprises:
receiving, by the first BS from the UE, a report indicating the capability of the UE, the report including at least one of a list of transmission switching delay types associated with the UE, a frequency range supported by the UE, or a handover type supported by the UE.

16. The method of claim 11, further comprising:
transmitting, by the first BS to the UE, an instruction for the handover from the first BS to the second BS, wherein the receiving the first communication signal includes:
receiving, by the first BS from the UE, at least one of uplink data or a feedback for downlink data after transmitting the instruction.

17. The method of claim 16, wherein the transmitting the instruction includes:
transmitting, by the first BS to the UE, the instruction including at least one of the first TDM configuration or the second TDM configuration.

18. The method of claim 11, further comprising:
transmitting, by the first BS, an instruction to disable the second TDM configuration for communication with the UE.

19. A user equipment (UE) comprising:
a transceiver;
a memory; and
a processor coupled to the transceiver and the memory, the processor configured to:
transmit via the transceiver, to a first base station (BS), a first communication signal based on a first time-division multiplexed (TDM) configuration;
transmit via the transceiver, to a second BS different from the first BS, a second communication signal, the second communication signal being multiplexed with the first communication signal based on the first TDM configuration;
transmit via the transceiver, to the first BS or the second BS, an instruction to switch from the first TDM configuration to a second TDM configuration different from the first TDM configuration, wherein the first TDM configuration and the second TDM configuration are associated with a handover of the UE from the first BS to the second BS;
transmit via the transceiver, to the first BS, a third communication signal based on the second TDM configuration; and
transmit via the transceiver, to the second BS, a fourth communication signal, the fourth communication signal being multiplexed with the third communication signal based on the second TDM configuration.

20. The UE of claim 19, wherein the processor configured to transmit the instruction is configured to:
transmit the instruction via at least one of uplink control information (UCI) signaling, medium access control (MAC) control element (CE) signaling, or radio resource control (RRC) signaling to switch from the first TDM configuration to the second TDM configuration.

21. The UE of claim 19, wherein the processor is further configured to:
transmit via the transceiver, a capability report including at least one of a transmission switching delay associated with the UE, a frequency range supported by the UE, or a handover type supported by the UE.

22. The UE of claim 19, wherein the processor is further configured to:
receive via the transceiver, from the first BS, an instruction for the handover from the first BS to the second BS, the instruction including at least one of the first TDM configuration or the second TDM configuration; and
transmit via the transceiver, in response to the received instruction, the second communication signal by transmitting a random access preamble signal to establish a first connection with the second BS while maintaining a second connection with the first BS.

23. The UE of claim 19, wherein the processor is further configured to:

receive via the transceiver, an instruction to disable the second TDM configuration for transmission to at least one of the first BS or the second BS.

24. A first base station (BS) comprising:
a transceiver;
a memory; and
a processor coupled to the transceiver and the memory, the processor configured to:
  receive via the transceiver, from a user equipment (UE), a first communication signal based on a first time-division multiplexed (TDM) configuration, the first TDM configuration determined based on a coordination with a second BS for a handover of the UE to the second BS;
  receive via the transceiver, from the UE, an instruction to switch from the first TDM configuration to a second TDM configuration different from the first TDM configuration, the second TDM configuration associated with the handover of the UE; and
  receive via the transceiver, from the UE, a second communication signal based on the second TDM configuration.

25. The first BS of claim 24, wherein the processor configured to receive the instruction is configured to:
receive the instruction via at least one of uplink control information (UCI) signaling, medium access control (MAC) control element (CE) signaling, or radio resource control (RRC) signaling to switch from the first TDM configuration to the second TDM configuration.

26. The first BS of claim 24,
wherein the processor is further configured to coordinate, with the second BS, to determine at least one of the first TDM configuration or the second TDM configuration based on at least one of quality of service (QoS) requirement associated with the UE, a capability of the UE, a traffic loading associated with a first communication link between the first BS and the UE, a traffic loading associated with a second communication link between the UE and the second BS, a link quality associated with the first communication link, or a link quality associated with the second communication link.

27. The first BS of claim 26, wherein the processor is further configured to:
receive via the transceiver, from the UE, a report indicating the capability of the UE, the report including at least one of a transmission switching delay associated with the UE, a frequency range supported by the UE, or a handover type supported by the UE, and
wherein the at least one of the first TDM configuration or the second TDM configuration is further determined based on the capability of the UE.

* * * * *